US007540615B2

(12) United States Patent
Merzenich et al.

(10) Patent No.: US 7,540,615 B2
(45) Date of Patent: Jun. 2, 2009

(54) COGNITIVE TRAINING USING GUIDED EYE MOVEMENTS

(75) Inventors: Michael M. Merzenich, San Francisco, CA (US); Dylan Bird, San Francisco, CA (US); Donald F. Brenner, San Francisco, CA (US); Samuel C. Chan, Alameda, CA (US); Peter B. Delahunt, San Mateo, CA (US); Joseph L. Hardy, Richmond, CA (US); Stephen G. Lisberger, San Francisco, CA (US); Henry W. Mahncke, San Francisco, CA (US)

(73) Assignee: Posit Science Corporation, San Francisco, CA (US)

( * ) Notice: Subject to any disclaimer, the term of this patent is extended or adjusted under 35 U.S.C. 154(b) by 0 days.

(21) Appl. No.: 12/192,245

(22) Filed: Aug. 15, 2008

(65) Prior Publication Data
US 2009/0051877 A1    Feb. 26, 2009

Related U.S. Application Data

(63) Continuation-in-part of application No. 11/611,329, filed on Dec. 15, 2006.

(60) Provisional application No. 61/037,400, filed on Mar. 18, 2008, provisional application No. 60/983,242, filed on Oct. 29, 2007.

(51) Int. Cl.
A61B 3/00 (2006.01)
A61B 3/02 (2006.01)
(52) U.S. Cl. ............... 351/246; 351/203; 351/238; 351/239
(58) Field of Classification Search .......... 351/203, 351/211, 237–242, 246, 223
See application file for complete search history.

(56) References Cited

U.S. PATENT DOCUMENTS 4,971,434 A    11/1990    Ball (Continued)

FOREIGN PATENT DOCUMENTS

DE    69529054    8/2003

(Continued)

OTHER PUBLICATIONS

Sekuler et al. "Visual localization: age and practice." Optical Society of America. vol. 3, No. 6. Jun. 1986. pp. 864-867.

(Continued)

*Primary Examiner*—William C Choi
*Assistant Examiner*—Jack Dinh
(74) *Attorney, Agent, or Firm*—James W. Huffman; Mark Williams

(57) ABSTRACT

Computer-implemented method for enhancing a participant's cognition, including, e.g., visual memory, utilizing a computing device to present visual stimuli for training, and to record responses from the participant. Multiple graphical elements are provided for visual presentation to the participant. A temporal sequence of a plurality of the graphical elements is visually presented, including displaying each graphical element in the sequence at a respective location in a visual field for a specified duration, then ceasing to display the graphical element. The presented graphical elements include at least two matching graphical elements. The participant is required to respond to the presented sequence, including indicating locations of matching graphical elements. A determination is made as to whether the participant responded correctly, and the duration modified based on the determining. The visually presenting, requiring, determining, and modifying are repeated one or more times in an iterative manner to improve the participant's cognition.

45 Claims, 18 Drawing Sheets

U.S. PATENT DOCUMENTS

| | | |
|---|---|---|
| 5,801,810 A | 9/1998 | Roenker |
| 6,328,569 B1 | 12/2001 | Jenkins et al. |
| 6,364,486 B1 | 4/2002 | Ball et al. |
| 6,464,356 B1 | 10/2002 | Sabel et al. |
| 6,599,129 B2 | 7/2003 | Jenkins et al. |
| 2007/0166675 A1 | 7/2007 | Atkins et al. |
| 2007/0166676 A1 | 7/2007 | Bird et al. |
| 2007/0218439 A1 | 9/2007 | Delahunt et al. |
| 2007/0218440 A1 | 9/2007 | Delahunt et al. |
| 2007/0218441 A1 | 9/2007 | Delahunt et al. |
| 2007/0293732 A1 | 12/2007 | Delahunt et al. |
| 2008/0084427 A1 | 4/2008 | Delahunt et al. |

FOREIGN PATENT DOCUMENTS

| | | |
|---|---|---|
| EP | 00502984 | 12/1992 |
| EP | 1069855 | 8/2001 |
| WO | WO9952419 | 10/1999 |
| WO | WO03065964 | 8/2003 |

OTHER PUBLICATIONS

Ball et al. "Effects of Cognitive Training Interventions With Older Adults: A Randomized Controlled Trial." American Medical Association. Nov. 13, 2002. vol. 288, No. 18. pp. 2271-2281.

Type 1, Set 1

Type 1, Set 2

Type 1, Set 3

Type 2, Set 1

Type 2, Set 2

Type 2, Set 3

Type 3, Set 1

Type 3, Set 2

Type 3, Set 3

Sidebar Layout

Sidebar Look and Feel

COGNITIVE TRAINING USING GUIDED EYE MOVEMENTS

CROSS REFERENCE TO RELATED APPLICATION(S)

This application claims the benefit of the following U.S. Provisional Patent Applications, which are incorporated herein in their entirety for all purposes:

| Docket No. | Ser. No. | Filing Date: | Title: |
|---|---|---|---|
| PS.0146 | 60/983,242 | Oct. 29, 2007 | GARDEN GROWER ASSESSMENT |
| PS.0153 | 61/037,400 | Mar. 18, 2008 | MASTER GARDENER |

This application is a Continuation-In-Part of the following U.S. patent application, which is incorporated herein in its entirety for all purposes:

| | | | |
|---|---|---|---|
| PS.0225 | 11/611,329 | Dec. 15, 2006 | COGNITIVE TRAINING USING GUIDED EYE MOVEMENTS |

FIELD OF THE INVENTION

This invention relates in general to the use of brain health programs utilizing brain plasticity to enhance human performance and correct neurological disorders, and more specifically, to a method for improving the ability of the visual nervous system to perform eye movements efficiently, and to improve cognition, including, e.g., visual memory.

BACKGROUND OF THE INVENTION

Almost every individual has a measurable deterioration of cognitive abilities as he or she ages. The experience of this decline may begin with occasional lapses in memory in one's thirties, such as increasing difficulty in remembering names and faces, and often progresses to more frequent lapses as one ages in which there is passing difficulty recalling the names of objects, or remembering a sequence of instructions to follow directions from one place to another. Typically, such decline accelerates in one's fifties and over subsequent decades, such that these lapses become noticeably more frequent. This is commonly dismissed as simply "a senior moment" or "getting older" In reality, this decline is to be expected and is predictable. It is often clinically referred to as "age-related cognitive decline," or "age-associated memory impairment" While often viewed (especially against more serious illnesses) as benign, such predictable age-related cognitive decline can severely alter quality of life by making daily tasks (e.g., driving a car, remembering the names of old friends) difficult.

Many daily tasks require extraction of visual information from a scene quickly and accurately. Avoiding dangers when driving a car, scanning a crowd for a familiar face, and reading quickly are a few examples of situations where visual information must be extracted quickly to perform well. Searching a scene involves two main processes. First, eyes make saccades—very rapid movements from one object to another. Second, the brain quickly captures information from each eye fixation so that the next saccade can be made. Efficient eye-movements and information processing involving visual memory are important for rapidly obtaining information from a scene.

As people get older, the frequency of rapid fixation eye-movements ("saccades") declines, as does their accuracy. In addition, the time required to extract relevant information from the visual scene during each fixation (between saccades) increases. As a result, the ability to extract information quickly and accurately from a visual scene declines, as does visual memory operations, e.g., storage and retrieval. In daily life, tasks that had been easy—like scanning a newspaper article for important details—get harder. This is important for tasks such as driving and crossing the road, as well as for reading speed and accuracy.

In many older adults, age-related cognitive decline leads to a more severe condition now known as Mild Cognitive Impairment (MCI), in which sufferers show specific sharp declines in cognitive function relative to their historical lifetime abilities while not meeting the formal clinical criteria for dementia. MCI is now recognized to be a likely prodromal condition to Alzheimer's Disease (AD) which represents the final collapse of cognitive abilities in an older adult. The development of novel therapies to prevent the onset of this devastating neurological disorder is a key goal for modern medical science.

The majority of the experimental efforts directed toward developing new strategies for ameliorating the cognitive and memory impacts of aging have focused on blocking and possibly reversing the pathological processes associated with the physical deterioration of the brain. However, the positive benefits provided by available therapeutic approaches (most notably, the cholinesterase inhibitors) have been modest to date in AD, and are not approved for earlier stages of memory and cognitive loss such as age-related cognitive decline and MCI.

Cognitive training is another potentially potent therapeutic approach to the problems of age-related cognitive decline, MCI, and AD. This approach typically employs computer- or clinician-guided training to teach subjects cognitive strategies to mitigate their memory loss. Although moderate gains in memory and cognitive abilities have been recorded with cognitive training, the general applicability of this approach has been significantly limited by two factors: 1) Lack of Generalization; and 2) Lack of enduring effect.

Lack of Generalization: Training benefits typically do not generalize beyond the trained skills to other types of cognitive tasks or to other "real-world" behavioral abilities. As a result, effecting significant changes in overall cognitive status would require exhaustive training of all relevant abilities, which is typically infeasible given time constraints on training.

Lack of Enduring Effect: Training benefits generally do not endure for significant periods of time following the end of training. As a result, cognitive training has appeared infeasible given the time available for training sessions, particularly from people who suffer only early cognitive impairments and may still be quite busy with daily activities.

As a result of overall moderate efficacy, lack of generalization, and lack of enduring effect, no cognitive training strategies are broadly applied to the problems of age-related cognitive decline, and to date they have had negligible commercial impacts. The applicants believe that a significantly innovative type of training can be developed that will surmount these challenges and lead to fundamental improvements in the treatment of age-related cognitive decline. This innovation is based on a deep understanding of the science of "brain plasticity" that has emerged from basic research in neuroscience over the past twenty years, which only now through the application of computer technology can be brought out of the laboratory and into the everyday therapeutic treatment.

Thus, improved systems and methods for improving the ability of the visual nervous system of a participant to perform eye movements efficiently and to improve cognition.

SUMMARY

Various embodiments of a system and method are presented for performing a computer-based exercise to renormalize and improve the ability of the visual nervous system of a participant to perform eye movements efficiently, and to improve cognition, including, e.g., visual memory. More specifically, the exercise may operate to improve the efficiency of saccades, decrease the time it takes to extract accurate information from a scene, and to improve cognition in general, as well as visual memory storage and retrieval.

First, multiple graphical elements may be provided, where the multiple graphical elements are available for visual presentation to the participant. In other words, a set of images, i.e., visual stimuli, may be provided for display to the participant. Examples of such graphical elements may include, but are not limited to, images of flowers, butterflies, and leaves, among others.

The sets of graphical elements, i.e., visual stimuli, may include different types, where each type has or corresponds to a respective visual emphasis, which as used herein refers to the degree to which an image is distinguishable from a background of the visual field, and where the sets of graphical elements within each type differ in discriminibility, which as used herein refers to the degree to which images in a set are distinguishable from each other. Note that the stimuli are designed to be progressively more difficult to discriminate within each set.

A temporal sequence of a plurality of the graphical elements may be visually presented, including displaying each graphical element at a respective location in a visual field for a specified duration, then ceasing to display the graphical element, where the plurality of the graphical elements includes at least two matching graphical elements. Said another way, a series of two or more graphical elements (from the multiple graphical elements) may be displayed in sequence, where each of the graphical elements is displayed for a specified time period at a respective location in the visual field, e.g., in a display area of a graphical user interface (GUI), then removed from view, e.g., hidden, not displayed, etc., e.g., prior to display of the next graphical element. In some embodiments, the temporal sequence may be presented in response to the participant clicking a start button (e.g., displayed on the screen).

In preferred embodiments, the plurality of graphical elements includes the at least two matching graphical elements and one or more distractors (i.e., distractor graphical elements, i.e., graphical elements from the current set that do not match), where the distractors differ from the matching graphical elements in colors, patterns, and/or shapes. The target and distractors for each trial may be randomly selected from the current set.

The GUI may include a visual field in which the sequence of graphical elements may be displayed, according to one embodiment. The visual field may include a plurality of potential stimulus locations, e.g., initially denoted by flower pots turned on their sides, where stimuli may be presented.

Visually presenting the temporal sequence of a plurality of the graphical elements may thus include presenting the graphical elements of the sequence at respective ones of the potential stimulus locations.

In some embodiments, the displayed visual field may include an active stimulus presentation area, and may also include an inactive stimulus presentation area, which may be distinguished by differences in coloration. The graphical elements of a sequence may only be displayed at locations in the active stimulus presentation area, which may change as the participant progresses through a level.

The participant may be required to respond to the displayed values. For example, the participant may be required indicate the locations of matching graphical elements, e.g., via a mouse, although any other means may be used as desired. In some embodiments, the order in which the locations of the matching graphical elements are indicated may be unimportant with respect to whether the response is correct or not, although in other embodiments, e.g., for added difficulty, the order may be taken into account, e.g., may be required for correctness, or may be used to determine bonus awards, etc. In some embodiments, the order in which the participant indicates the matching locations may not be important for determining correctness, but may still be an important aspect of the exercise. For example, in preferred embodiments, the final matching location selected by the participant in a correct response may be the location for display of a consequential reward, e.g., may specify the location for display of a graphical reward or indication of a reward, as will be described in more detail below.

A determination may be made as to whether the participant responded correctly. For example, a determination may be made as to whether the participant correctly indicated the locations of matching graphical elements in the presented sequence. In preferred embodiments, the method may include audibly and/or graphically indicating whether the participant responded correctly. In some embodiments, indicating whether the participant responded correctly may include indicating whether the participants selection is correct for each selection, e.g., for each selection, an indicative sound, such as a "ding" or "thunk" (and/or a graphical indication) may be played indicating whether that selection were correct or incorrect, respectively. In some embodiments, points may be awarded (in the case of a correct response and/or selection). Of course, any other type of indication may be used as desired. For example, in one embodiment, a first sound, e.g., a wind sound, may be played when the participant makes a correct selection, and a second sound, e.g., a chime sound, may be played when the participant has made all location indications correctly. Thus, indicating whether the participant responded correctly may include: for each location indication, indicating whether the indicated location is correct.

The duration may be modified based on the above determining. In other words, the time period specified for displaying each graphical element may be adjusted based on whether the participant responded correctly. In one embodiment, adjusting the stimulus intensity may include decreasing the duration if the participant responds correctly, and increasing the duration if the participant responds incorrectly. Thus, for example, in one embodiment, the duration may be set initially at 500 ms, and may be adapted based on performance. The above described visually presenting, requiring, determining, and possibly modifying may compose performing a trial in the exercise.

In one embodiment, the modifying/adjusting may be performed using a maximum likelihood procedure, such as, for example, a QUEST (quick estimation by sequential testing)

threshold procedure, and/or a ZEST (zippy estimation by sequential testing) threshold procedure, e.g., a single-stair maximum likelihood procedure, as described below in more detail.

It should be noted that while in preferred embodiments, the duration is adjusted, in other embodiments, in addition to, or instead of, the duration, other attributes of the stimuli and/or the presentation may be adjusted or modified as desired. Such adjustable attributes may be referred to generically as stimulus intensity. In other words, the stimulus intensity may be any adjustable attribute of the graphical elements and/or their presentation, e.g., the eccentricity of the respective positions of the least two graphical elements in the visual field, the number of graphical elements in the temporal sequence, and/or the appearance, e.g., discriminibility, or visual emphasis of the graphical elements, e.g., the size, contrast, color, homogeneity, etc., of the graphical elements in the visual field, among others. In other words, the stimulus intensity may refer to any adjustable attribute of the stimulus and/or its presentation that may be modified to increase or decrease the difficulty of trials in the exercise. Thus, more generally, in some embodiments, the sequence of graphical elements may be presented with a specified stimulus intensity, and the stimulus intensity may be modified based on the participant's response, where modifying the stimulus intensity may include (adaptively) modifying any of these adjustable attributes as desired.

In some embodiments, each response of the participant may be recorded. Similarly, in some embodiments, the method may include recording whether the participant responded correctly. For example, the responses and/or their correctness/incorrectness may be stored in a memory medium of the computing device, or coupled to the computing device.

The visually presenting, requiring, determining, and modifying may be repeated one or more times in an iterative manner to improve the participant's cognition, including, e.g., visual memory. For example, the repetitions may be performed over a plurality of sessions, e.g., over days, weeks, or even months, e.g., for a specified number of times per day, and for a specified number of days.

Other features and advantages of the present invention will become apparent upon study of the remaining portions of the specification and drawings.

DETAILED DESCRIPTION

Figure 1:
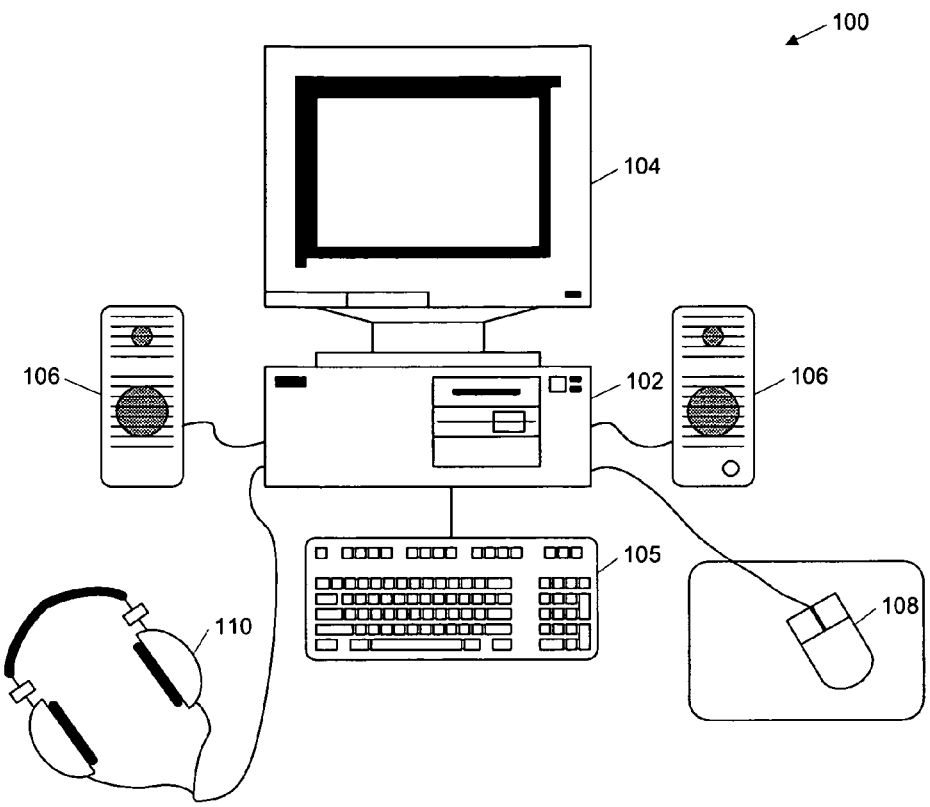
FIG. 1 is a block diagram of a computer system for executing a program according to some embodiments of the present invention.

Referring to FIG. 1, one embodiment of a computer system 100 is shown for executing a computer program to train, or retrain an individual according to the present invention to enhance cognition generally, where the term "cognition" refers to the speed, accuracy and reliability of processing of information, and attention and/or memory, and where the term "attention" refers to the facilitation of a target and/or suppression of a non-target over a given spatial extent, object-specific area or time window, and more specifically, to improve cognition, including, e.g., visual memory. The computer system 100 contains a computer 102, having a CPU, memory, hard disk and CD ROM drive (not shown), attached to a monitor 104. The monitor 104 provides visual prompting and feedback to the subject during execution of the computer program. As may be seen, in this embodiment, attached to the computer 102 are a keyboard 105, speakers 106, a mouse 108, and headphones 110. In some embodiments, the speakers 106 and the headphones 110 may provide auditory prompting and feedback to the subject during execution of the computer program. The mouse 108 allows the subject to navigate through the computer program, and to select particular responses after visual or auditory prompting by the computer program. The keyboard 105 allows an instructor to enter alphanumeric information about the subject into the computer 102. Although a number of different computer platforms are applicable to the present invention, embodiments of the present invention execute on either IBM compatible computers or Macintosh computers, or similarly configured computing devices such as set top boxes, PDA's, gaming consoles, etc.

Figure 2:
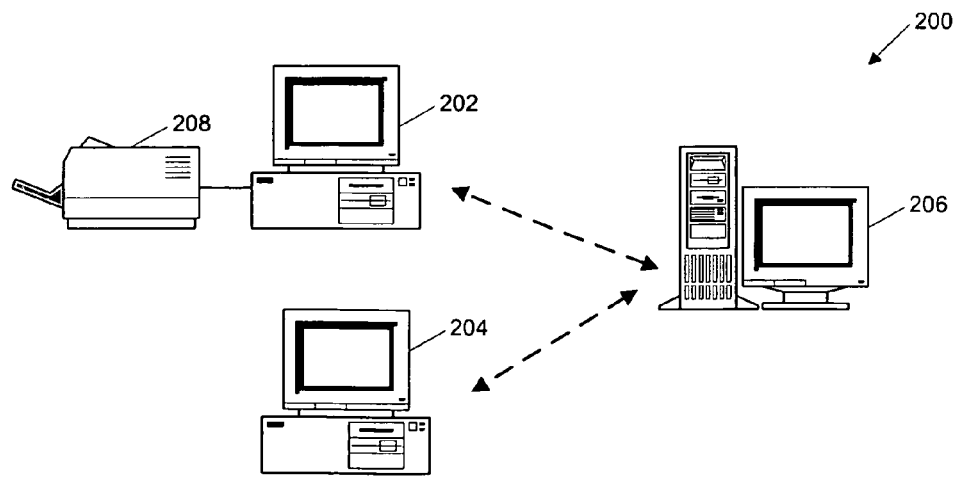
FIG. 2 is a block diagram of a computer network for executing a program according to some embodiments of the present invention.

Now referring to FIG. 2, a computer network 200 is shown. The computer network 200 contains computers 202, 204, similar to that described above with reference to FIG. 1, connected to a server 206. The connection between the computers 202, 204 and the server 206 can be made via a local area network (LAN), a wide area network (WAN), or via modem connections, directly or through the Internet. A printer 208 is shown connected to the computer 202 to illustrate that a subject can print out reports associated with the computer program of the present invention. The computer network 200 allows information such as test scores, game statistics, and other subject information to flow from a subject's computer 202, 204 to a server 206. An administrator can review the information and can then download configuration and control information pertaining to a particular subject, back to the subject's computer 202, 204.

Overview of the Guided Eye Movement Exercise

Embodiments of the computer-based exercise described herein may operate to renormalize and improve the ability of the visual nervous system of a participant to perform eye movements efficiently, and to improve cognition in general, including, e.g., visual memory. More specifically, the exercise may operate to improve the efficiency of saccades and decrease the time it takes to extract accurate information from a scene, and may improve storage, retention, and retrieval of visual memory, as well as general cognition.

In embodiments of this exercise, for each of a number of trials, the participant is required to move his or her gaze rapidly to a sequence of targets, specifically, graphical elements, presented on the monitor in a specific order, and remember visual details regarding each target. The participant then responds by indicating the locations of any matching targets in the sequence. Over the course of the exercise, the presentation duration for each graphical element may be adjusted in an adaptive manner, based on the participant's performance. Note that while embodiments of the exercise described herein are presented in the context of various flower gardens, this context is meant to be exemplary only, and any other contexts or premises may be used as desired.

It should be noted that various embodiments of the guided eye movement exercise described herein, and/or other eye movement tasks, may be used singly or in combination in the exercise. Moreover, as described below, in some embodiments, stimulus threshold assessments may also be performed in conjunction with, or as part of, the exercise, thus facilitating more effective training of the participant's cognitive systems, e.g., visual memory and processing systems.

Figure 3:
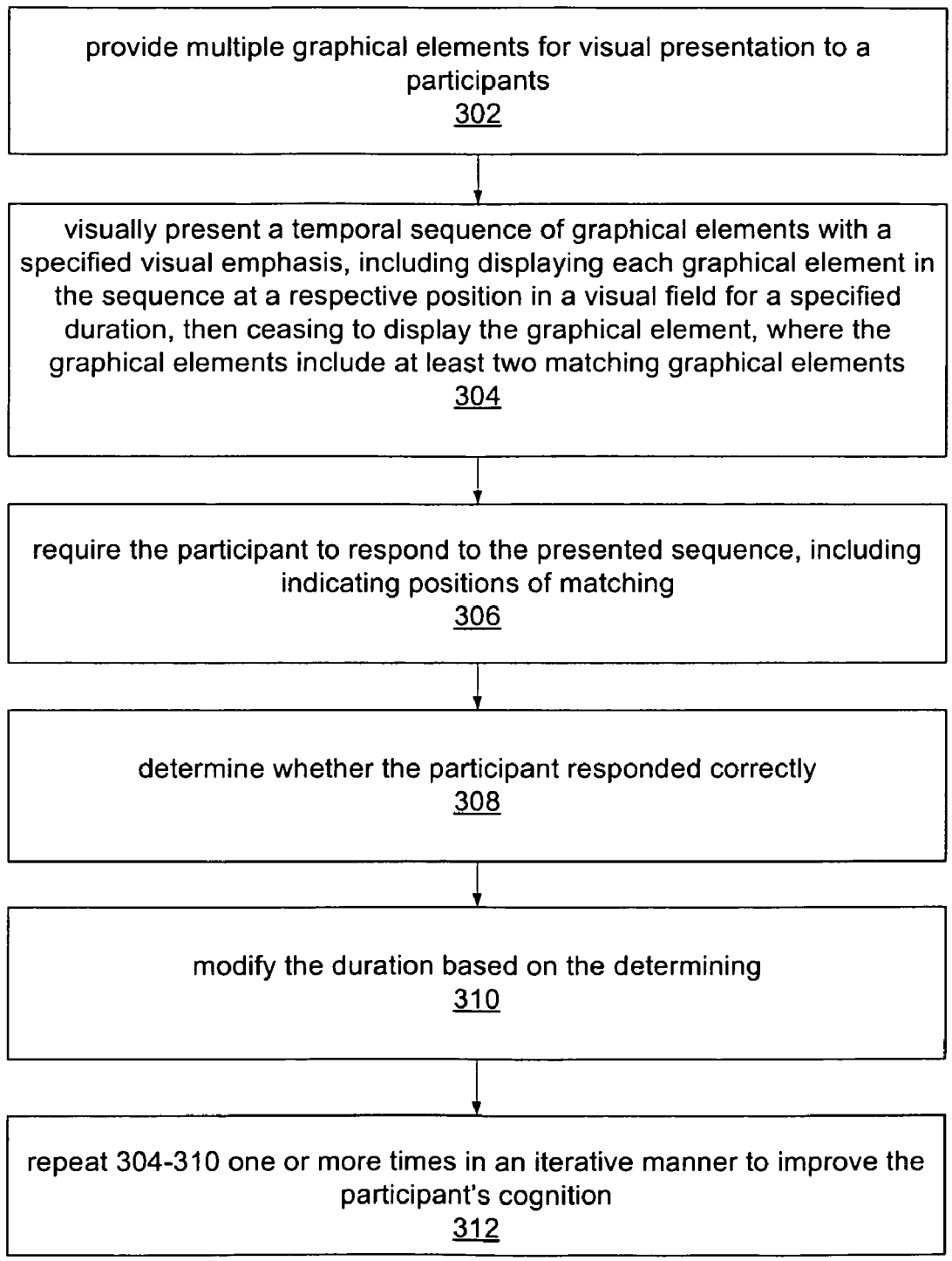
FIG. 3 is a high-level flowchart of one embodiment of a method for improving cognition, including, e.g., visual memory, using eye movement, according to one embodiment.

FIG. 3—Flowchart of a Method for Improving Cognition Using Guided Eye Movement

FIG. 3 is a high-level flowchart of one embodiment of a method for improving cognition, including, e.g., visual memory, using guided eye movement. More specifically, the method utilizes a computing device to present a plurality of images, including a target image and a plurality of distractor images, from which a participant is to select the target image, and to record responses from the participant. It should be noted that in various embodiments, some of the method elements may be performed concurrently, in a different order than shown, or may be omitted. Additional method elements may also be performed as desired. As shown, the method may be performed as follows:

In 302, multiple graphical elements may be provided, where the multiple graphical elements are available for visual presentation to the participant. In other words, a set of images, i.e., visual stimuli, may be provided for display to the participant. Examples of such graphical elements may include, but are not limited to, images of flowers, butterflies, and leaves, among others, as discussed below.

Figure 4A:
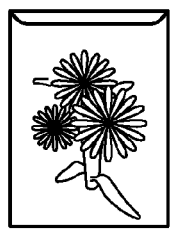
FIGS. 4A-4C illustrate exemplary visual stimuli sets with different discriminibility, according to one embodiment.
Figure 4A:
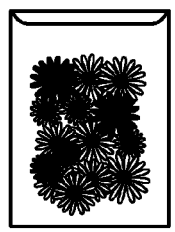
Figure 4A:
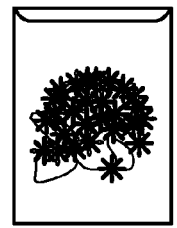
Figure 4A:
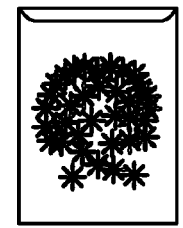
Figure 4A:
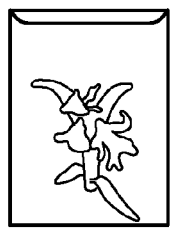
Figure 4A:
Figure 4A:
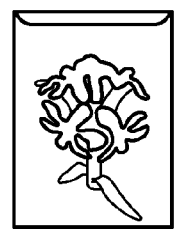
Figure 4A:
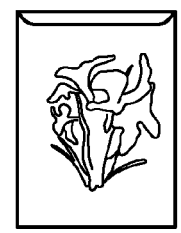
Figure 4A:
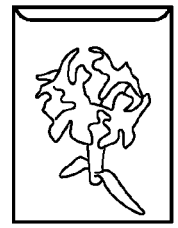
Figure 4A:
Figure 4A:
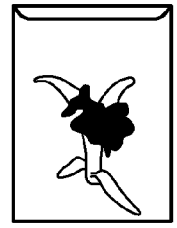
Figure 4A:
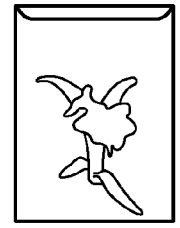
Figure 4A:
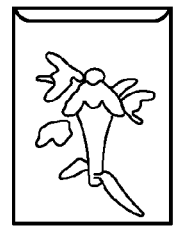
Figure 4A:
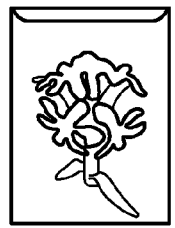
Figure 4A:
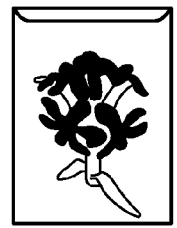
Figure 4A:
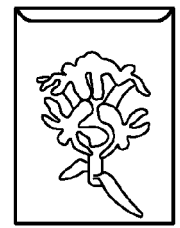
Figure 4A:
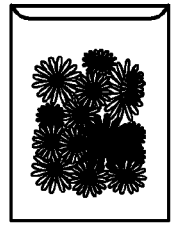
Figure 4A:
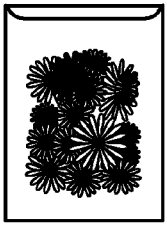
Figure 4A:
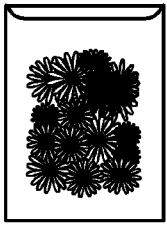
Figure 4A:
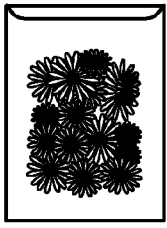
Figure 4A:
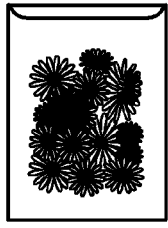
Figure 4A:
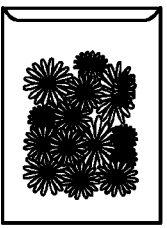
Figure 4A:
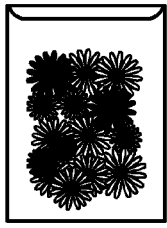
Figure 4A:
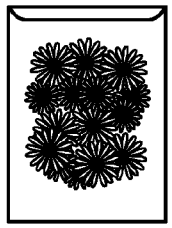
Figure 4B:
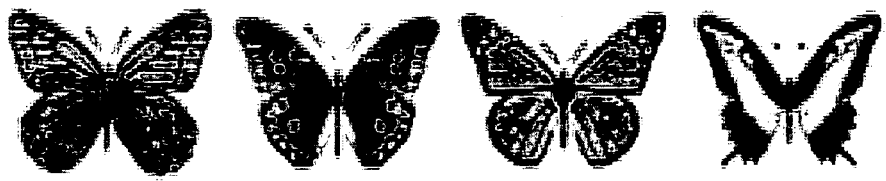
Figure 4B:
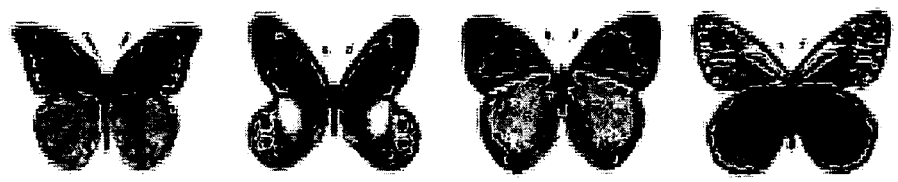
Figure 4B:
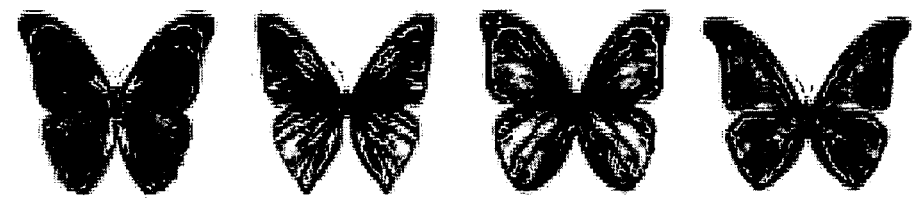
Figure 4B:
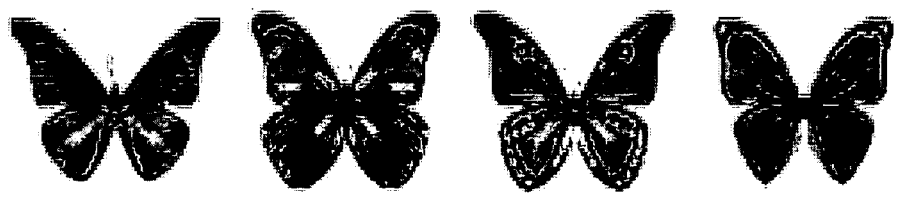
Figure 4B:
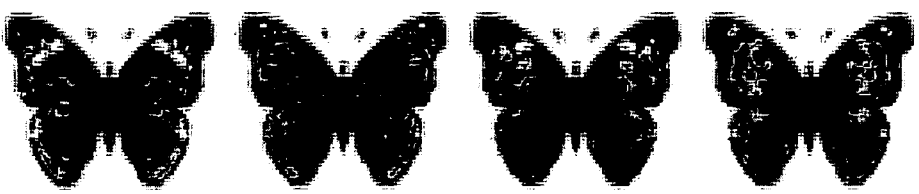
Figure 4B:
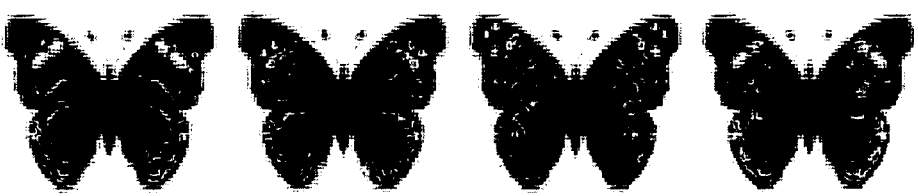
Figure 4C:
Figure 4C:
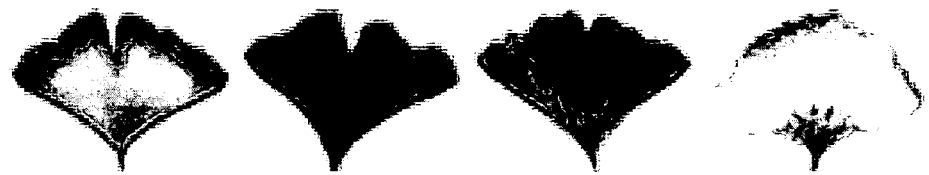
Figure 4C:
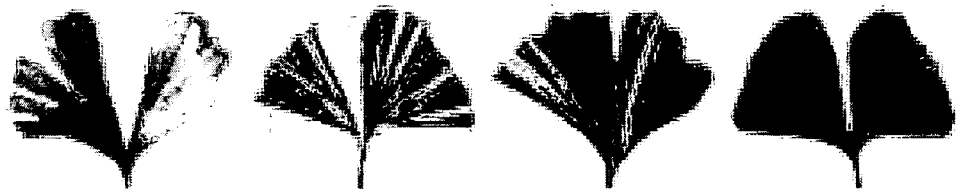
Figure 4C:
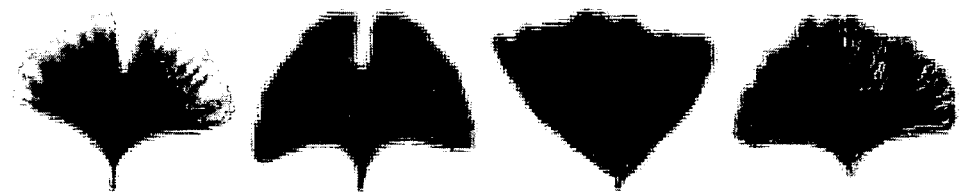
Figure 4C:
Figure 4C:

FIGS. 4A-4C illustrate exemplary sets of graphical elements, i.e., visual stimuli, of three different types, where each type has or corresponds to a respective visual emphasis, which as used herein refers to the degree to which an image is distinguishable from a background of the visual field, and where the sets of graphical elements within each type differ in discriminibility, which as used herein refers to the degree to which images in a set are distinguishable from each other. In one exemplary embodiment, each stimulus type may include three sets of eight stimuli, where the stimuli in each set may be progressively more difficult to distinguish from others in the set.

FIG. 4A illustrates three sets of graphical elements of a first visual stimulus type, i.e., with a first visual emphasis level, in this particular embodiment, seed packets for flowers. As may be seen, the graphical elements of each of the sets have a distinct rectangular border which would be easily distinguished from a background, i.e., which makes each of the graphical elements distinct from the background, having hard edges and a uniform shape. Additionally, note that the first set (top two rows) includes images of flowers which are quite distinct from each other with respect to color, pattern, and/or shape, while the second set (middle two rows) includes images of flowers which are generally similar with respect to shape, but are (for the most part) different with respect to color. Finally, note that the third set (bottom two rows) includes images of flowers which are identical or almost identical with respect to pattern and shape, and which are in many cases very similar color-wise. Thus, visual stimuli with the same or similar visual emphasis may still be of differing discriminibility.

FIG. 4B illustrates three sets of graphical elements of a second visual stimulus type, i.e., with a second visual emphasis level, in this example case, butterflies. As shown, the graphical elements of each of these sets do not have the distinct rectangular border of the first type, and so are less easily distinguished from a background. Additionally, note that the first set (top two rows) includes images of butterflies which are substantially distinct from each other with respect to color, pattern, and shape, while the second set (middle two rows) includes images of butterflies which are somewhat similar with respect to color and pattern, but which differ somewhat with respect to shape. Finally, note that the third set (bottom two rows) includes images of butterflies which are very similar with respect to shape and color. As may be seen, compared to those of FIG. 4A, these graphical elements are less distinct from background, have aliased edges, and varying shapes. Note that in some embodiments, some parts of the graphical elements may be transparent, i.e., may permits portions of the background to show through the image. In other words, these images may not be "framed" as they are in the images of FIG. 4A (seed packets), and so the images (e.g., of the butterflies) may be less distinct with respect to the background of the visual field.

Note that with respect to the exemplary butterfly stimuli of FIG. 4B, one may see that there is less variation in shape and color across all sets and more variation in the patterns on the wings. Moreover, all stimuli may be roughly the same size. The below summarizes the characteristics of each of the three exemplary sets of FIG. 4B:

TABLE 1

|  | Set 1 | Set 2 | Set 3 |
| --- | --- | --- | --- |
| Shape | Any real world butterfly shape (which are already relatively similar) | Variations on a single type of butterfly | Same butterfly shape for all |
| Pattern | Distinct patterns | Distinct patterns (but less so than in set 1) | Similar patterns |
| Color | Color variations in a range of colors (e.g., all warm colors) | Slight color variation | Similar colors |

Thus, the sets of stimuli may include stimuli of varying discriminibility based on their graphical attributes.

FIG. 4C illustrates a further three sets of graphical elements of a third visual stimulus type, i.e., with a third visual emphasis level, according to one embodiment. As may be seen, these graphical elements are images of leaves, and like the butterflies of FIG. 4B, are not framed, and thus are more difficult to distinguish from a background. Note that each of the three sets shown is characterized by the respective discriminibility of the graphical elements in the set. The graphical elements of the first set are fairly distinguishable from each other via color scheme and shape, while the graphical elements of the second set are less so, and those of the third set are very similar with respect to color, and also generally similar with respect to shape.

The exemplary seed packet, butterfly and leaf stimuli are designed to be progressively more difficult to discriminate within each set. It should be noted that the visual stimuli shown in FIGS. 4A-4C are meant to be exemplary only, and are not intended to limit the graphical elements used to any particular forms, patterns, colors, or objects.

In 304, a temporal sequence of a plurality of the graphical elements may be visually presented, including displaying each graphical element at a respective location in a visual field for a specified duration, then ceasing to display the graphical element, where the plurality of the graphical elements includes at least two matching graphical elements. Said another way, a series of two or more (or, e.g., three or more) graphical elements (from the multiple graphical elements of 302) may be displayed in sequence, where each of the graphical elements is displayed for a specified time period at a respective location in the visual field, e.g., in a display area of a graphical user interface (GUI), then removed from view, e.g., hidden, not displayed, etc., e.g., prior to display of the next graphical element. In some embodiments, the temporal sequence may be presented in response to the participant clicking a start button (e.g., displayed on the screen).

In preferred embodiments, the plurality of graphical elements includes the at least two matching graphical elements and one or more distractors (i.e., distractor graphical elements, i.e., graphical elements from the current set that do not match), where the distractors differ from the matching graphical elements in colors, patterns, and/or shapes, as exemplified by the graphical elements of FIGS. 4A-4C, discussed above. The target and distractors for each trial may be randomly selected from the current set.

Figure 5:
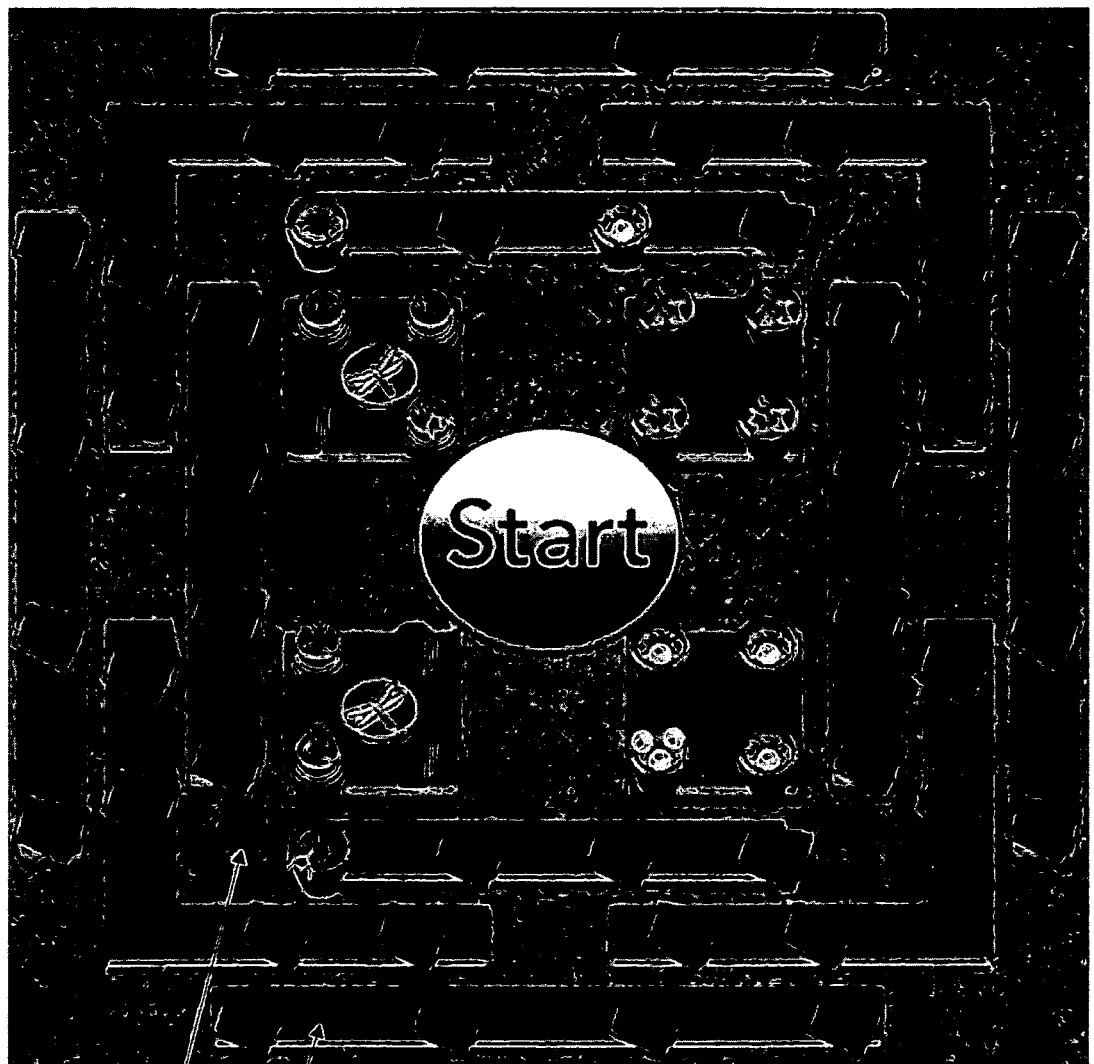
FIG. 5 illustrates an exemplary screenshot of a visual field with active stimulus presentation area in a guided eye movement exercise, according to one embodiment.

FIG. 5 illustrates an exemplary screenshot of a GUI with a visual field in which the sequence of graphical elements may be displayed, according to one embodiment. As may be seen, in this example, the visual field includes a plurality of potential stimulus locations, in this case, initially denoted by flower pots turned on their sides, as will be discussed at length below. Visually presenting the temporal sequence of a plurality of the graphical elements may thus include presenting the graphical elements of the sequence at respective ones of the potential stimulus locations.

In some embodiments, the respective locations (i.e., positions) of the graphical elements may be selected or determined randomly or pseudo-randomly. For example, the locations may be selected via pseudo-random numbers, e.g., from a set of pre-defined locations. As is well-known to those of skill in the art, there are numerous ways of selecting such items (locations) randomly or pseudo-randomly, any of which may be used as desired. For example, in one embodiment, a pseudo-random sequence, e.g., a low-discrepancy sequence such as a Halton sequence, may be used. Moreover, in various embodiments, the particular locations used for each trial may be determined in real-time, and/or may be pre-defined (or partially pre-defined) for the exercise, as desired. In some embodiments, each stimulus may be required to be a minimum distance away from the previously displayed stimulus. This may be enforced through the exercise layout—stimuli may appear only where the pots are positioned in the layout.

As FIG. 5 also illustrates, in some embodiments, the displayed visual field may include an active stimulus presentation area, as indicated by 502, and may also include an inactive stimulus presentation area, indicated by 504, distinguished by differences in coloration. The graphical elements of a sequence may only be displayed at locations in the active stimulus presentation area, which may change as the participant progresses through a level, as will be described in detail below.

Note that the example visual field of FIG. 5 also shows various icons indicating results of prior trials, specifically, flowers in various stages of development or growth, as will also be described in detail below.

In 306, the participant may be required to respond to the displayed values. For example, the participant may be required indicate the locations of matching graphical elements, e.g., via a mouse, although any other means may be used as desired. In some embodiments, the order in which the locations of the matching graphical elements are indicated may be unimportant with respect to whether the response is correct or not, although in other embodiments, e.g., for added difficulty, the order may be taken into account, e.g., may be required for correctness, or may be used to determine bonus awards, etc.

In some embodiments, the order in which the participant indicates the matching locations may not be important for determining correctness, but may still be an important aspect of the exercise. For example, in preferred embodiments, the final matching location selected by the participant in a correct response may be the location for display of a consequential reward, e.g., may specify the location for display of a graphical reward or indication of a reward, as will be described in more detail below.

In 308, a determination may be made as to whether the participant responded correctly. For example, a determination may be made as to whether the participant correctly indicated the locations of matching graphical elements in the presented sequence. In preferred embodiments, the method may include audibly and/or graphically indicating whether the participant responded correctly. In some embodiments, indicating whether the participant responded correctly may include indicating whether the participant's selection is correct for each selection, e.g., for each selection, an indicative sound, such as a "ding" or "thunk" (and/or a graphical indication) may be played indicating whether that selection were correct or incorrect, respectively. In some embodiments, points may be awarded (in the case of a correct response and/or selection). Of course, any other type of indication may be used as desired. For example, in one embodiment, a first sound, e.g., a wind sound, may be played when the participant makes a correct selection, and a second sound, e.g., a chime sound, may be played when the participant has made all location indications correctly. Thus, indicating whether the participant responded correctly may include: for each location indication, indicating whether the indicated location is correct.

In 310, the duration may be modified based on the above determining. In other words, the time period specified for displaying each graphical element may be adjusted based on whether the participant responded correctly. In one embodiment, adjusting the stimulus intensity may include decreasing the duration if the participant responds correctly, and increasing the duration if the participant responds incorrectly. Thus, for example, in one embodiment, the duration may be set initially at 500 ms, and may be adapted based on performance. The above described visually presenting, requiring, determining, and possibly modifying may compose performing a trial in the exercise.

In one embodiment, the modifying/adjusting may be performed using a maximum likelihood procedure, such as, for example, a QUEST (quick estimation by sequential testing) threshold procedure, and/or a ZEST (zippy estimation by sequential testing) threshold procedure, e.g., a single-stair maximum likelihood procedure, as described below in more detail.

It should be noted that while in preferred embodiments, the duration is adjusted, in other embodiments, in addition to, or instead of, the duration, other attributes of the stimuli and/or the presentation may be adjusted or modified as desired. Such adjustable attributes may be referred to generically as stimulus intensity. In other words, the stimulus intensity may be any adjustable attribute of the graphical elements and/or their presentation, e.g., the eccentricity of the respective positions of the least two graphical elements in the visual field, the number of graphical elements in the temporal sequence, and/or the appearance, e.g., discriminibility, or visual emphasis of the graphical elements, e.g., the size, contrast, color, homogeneity, etc., of the graphical elements in the visual field, among others. In other words, the stimulus intensity may refer to any adjustable attribute of the stimulus and/or its presentation that may be modified to increase or decrease the difficulty of trials in the exercise. Thus, more generally, in some embodiments, the sequence of graphical elements may be presented with a specified stimulus intensity, and the stimulus intensity may be modified based on the participant's response, where modifying the stimulus intensity may include (adaptively) modifying any of these adjustable attributes as desired.

In some embodiments, each response of the participant may be recorded. Similarly, in some embodiments, the method may include recording whether the participant responded correctly. For example, the responses and/or their correctness/incorrectness may be stored in a memory medium of the computing device, or coupled to the computing device.

In 312, the visually presenting, requiring, determining, and modifying may be repeated one or more times in an iterative manner to improve the participant's cognition, including, e.g., visual memory. For example, the repetitions may be performed over a plurality of sessions, e.g., over days, weeks, or even months, e.g., for a specified number of times per day, and for a specified number of days.

In preferred embodiments, the repeating may include performing a plurality of trials under each of a plurality of configurations, where each configuration specifies one or more attributes of the plurality of graphical elements or their presentation, as will be described in more detail below.

In some embodiments, over the course of performing the plurality of trials, the duration may be adjusted (i.e., the modifying of 310) to approach and substantially maintain a specified success rate for the participant. For example, the duration may be adjusted to approach and substantially maintain a specified success rate for the participant uses a single stair maximum likelihood procedure, e.g., a single stair ZEST procedure. Moreover, in further embodiments, the adjusting the duration to approach and substantially maintain a specified success rate for the participant may be performed for each of the plurality of configurations, as will be discussed in more detail below.

Figure 6A:
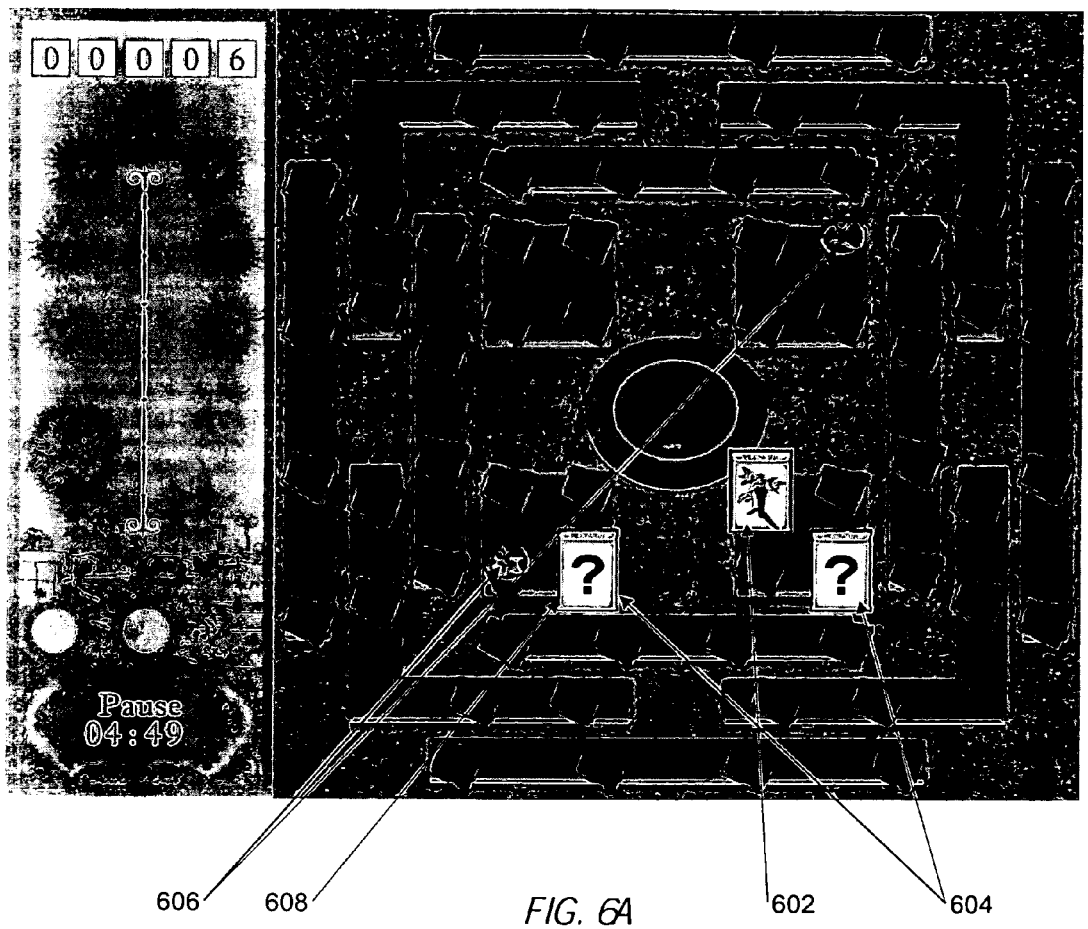
FIG. 6A-6C illustrate exemplary screenshots of a trial in a guided eye movement exercise, according to one embodiment.
Figure 6B:
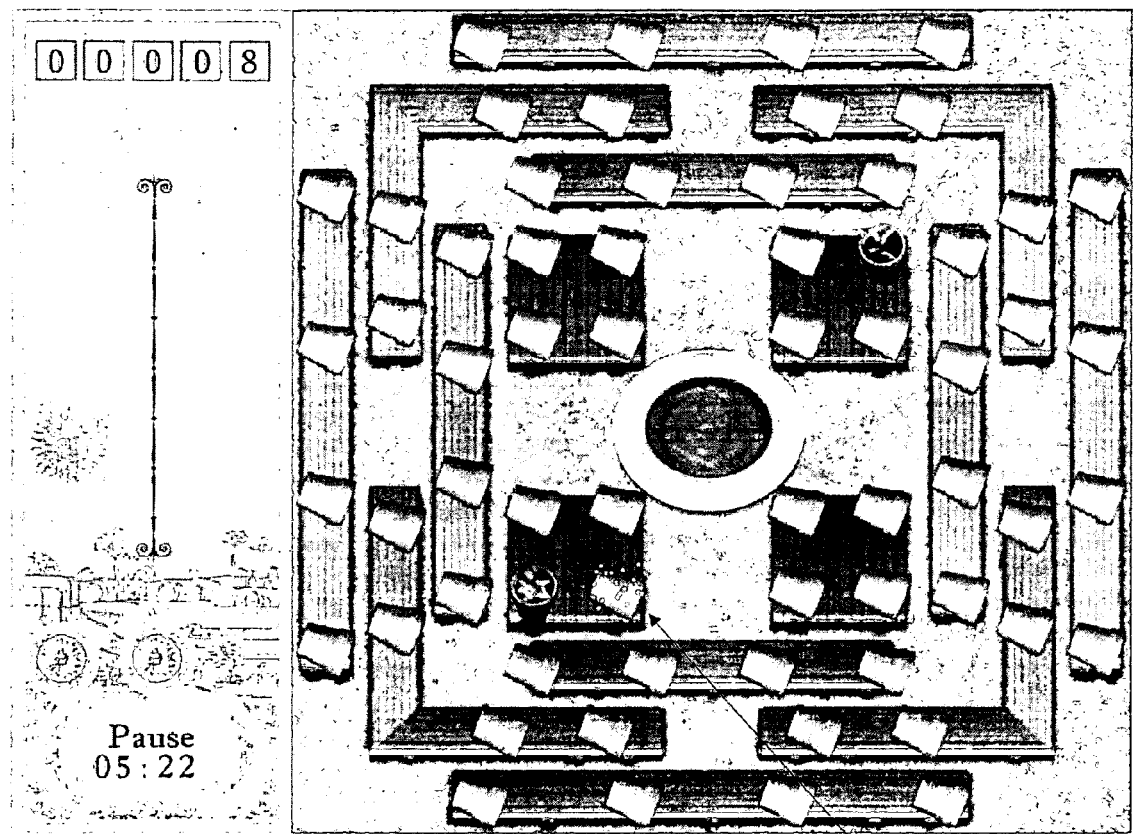
Figure 6C:

FIGS. 6A-6C illustrate some of the above aspects of the guided eye movement training exercise, according to one embodiment. FIG. 6A illustrates an exemplary screenshot of a GUI similar to that of FIG. 5, where the final (in this case, the third of three) graphical element of a sequence is being presented, as indicated in 602, which in this case is a seed packet with an image of a blue-green flower. As shown, in this exemplary embodiment, the locations where the previous two stimuli were presented (lower left and right) now contain seed packet outlines with question marks in them, as indicated by 604. After the third stimulus disappears, there will be three seed packets with question marks. The participant should click on the two locations 604 corresponding to the seed packets that displayed the same flower. In this case, the lower left and upper packets matched, and the user clicked on the upper location first, then on the lower left location, indicated by 608, which is a correct response. Note that in this example, two locations, indicated by 606, have already been correctly selected or indicated in previous trials, and indicate development or growth, which is discussed at length below.

In some embodiments, indicating whether the participant responded correctly may include presenting a reward in response to the participant responding correctly, and/or presenting a punishment in response to the participant not responding correctly. As noted above, in some embodiments, the order in which the participant indicates the matching locations may not be important for determining correctness, but may still be an important aspect of the exercise, e.g., the final matching location selected by the participant in a correct response may be the location for display of a graphical reward. In other words, determining if the participant responded correctly may include determining that the participant correctly indicated the locations of all matching graphical elements in the sequence, where the indicated locations include a first indicated location and a last indicated location. Presenting a reward in response to the participant responding correctly may then include presenting a graphical reward at the last indicated location. Note that this allows the participant to assert some control over where rewards may occur. Of course, other reward placement schemes may be used as desired, e.g., placing the reward at the first indicated location in a correct response, placing the reward at a random one of the indicated matching locations, etc.

FIG. 6B illustrates the GUI of FIG. 6A, and further shows a graphical effect 610 denoting a proper response, i.e., particle effects that indicate a correct trial. In this case, the particle effects operate as a visual transition to a graphical reward, as illustrated in FIG. 6C. As shown in FIG. 6C, in response to the participant correctly indicating the locations of the two matching graphical elements in the sequence, the (sideways) flower pot at the final matching location has been replaced with a flower growing at that location, as indicated by 612. Note that if the participant had indicated the two matching locations in the opposite order, the flower would be displayed at location 602 (see FIG. 6A) instead.

In one embodiment, each potential stimulus location may be associated with a respective object, where the object is progressable through a plurality of developmental stages, including an initial stage and a final stage. Each object may include or be associated with an icon indicating a current stage of the respective object and displayed at the potential stimulus location. Presenting a reward in response to the participant responding correctly may include incrementing the stage for an object associated with the final indicated location, including displaying the icon indicating the stage of the object. In other words, the participant may be rewarded by progression of objects through various stages of development.

Following the garden example mentioned above, in one exemplary embodiment, the exercise may use four different flower types. For example, in the first configuration with four groups in the stimulus presentation area, these flowers may be distributed randomly without repeating among the groups. Each flower within a group may be the same. When the configuration changes to include the next four groups in the stimulus presentation area, the flowers may once again be randomly distributed without repeating.

When a flower has progressed through all stages of growth, a new flower may be randomly selected to replace it. At this point more than one group in a stimulus presentation area may have the same flower type.

Each flower (or plant) may have a specified number of stages of growth, e.g., four, which may change after the final step of a correct response occurs over that flower. There may be an initial state before any growth has occurred (a flower pot on its side in the flower garden), and a plurality of subsequent growth or development stages, e.g.:

stage 1: Flower stalk with no blooms (or base, or bush);
stage 2: 1 flower bloom (or fruit, or leaf, etc.);
stage 3: 2 flower blooms (or fruits, or leaves, etc.); and
stage 4: 3 flower blooms (or fruits, or leaves, etc.).

Of course, these stages and descriptions are exemplary only—any other numbers, types, and descriptions of stages may be used as desired.

In some embodiments, when a flower reaches the final (e.g., fourth) stage of growth, stimulus can no longer appear over that flower (see exception below). That stimulus location may only be active again when the entire grouping has been returned to the initial state. When the flower returns to the initial state (pot on its side) the pot displayed may be a more elaborate pot indicating advancement even though the development stage has been reset, e.g., growth has been removed. The same flower (or a different more elaborate flower) may then grow in this pot.

Figure 7:
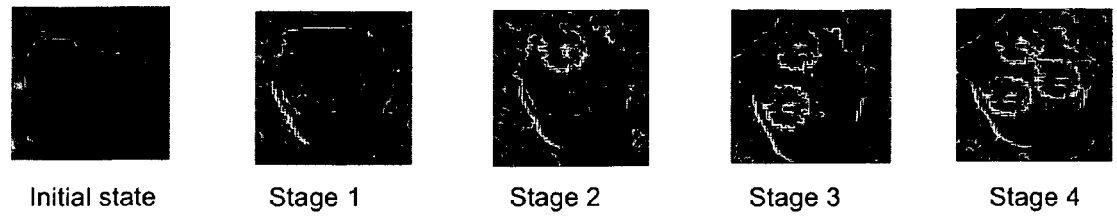
FIG. 7 illustrates an exemplary series of developmental stages for an object, according to one embodiment.

Turning now to FIG. 7, exemplary icons are shown representing a succession of developmental stages for an object, according to one embodiment, specifically, a flowering plant. More specifically, an initial state (empty flower pot) and four developmental stages (stages 1 through 4) are shown, where, as described above, as the participant correctly responds to the presented visual stimuli, objects progress through multiple stages as rewards for the correct responses, and respective icons indicating each stage are displayed in the presentation area, as may be seen in FIGS. 5 and 6A-6C. Note that the objects described and the icons shown are meant to be exemplary only, and are not intended to limit the objects or visual aspects of the reward or stage indicators (e.g., the icons) to any particular type, form, or appearance. Note further that in other embodiments, other numbers of developmental stages may be used as desired, e.g., more or less than four (beyond the initial state).

In some embodiments, the stage of development of objects may affect the presentation of the graphical elements. For example, in one embodiment, when an object associated with a potential stimulus location is at the final stage, graphical elements of a presented sequence may be prohibited from being displayed at that potential stimulus location.

The objects may be further organized to make the exercise more complex and interesting to the participant. For example, in one embodiment, the potential stimulus locations may include a plurality of groups, each comprising a respective disjoint subset of the potential stimulus locations with their respective objects. These elements of these groups may interact with each other in specified ways, particularly as regards rewards and developmental stages, and may provide unexpected or surprising behaviors that the participant may use strategically to progress through the exercise. In some embodiments, in addition to the rewards described above, which are directed to single objects and their developmental stages, group rewards may be awarded based on progress of objects within a group.

For example, in one embodiment, in response to determining that all objects in a group are at the final stage, a group reward may be presented. Moreover, all objects in the group may be reset to the initial stage, including updating the icons to indicate the initial stage. In some embodiments, this initial stage may differ from the original initial stage. For example, updating the icons to indicate the initial stage may include displaying an initial stage icon that indicates that presenting a group reward has occurred. For example, following the flowers example discussed above, an empty flower pot may be displayed, but it may be more elaborate, e.g., may be of a fancier variety, than the original flower pot indicating the original initial condition.

In further embodiments, the dynamics of these groups may include cascading rewards, where, for example, progression of an object to a specified stage, e.g., the final stage, may trigger automatic progression of other objects in the group. For example, in one embodiment, in response to determining that an object is at the final stage, the stage of each other object in the group may be incremented, the icons may be updated for each incremented object to indicate their respective stages. Moreover, this may be repeated for any objects whose stages have been incremented thusly to their final stages. In other words, the method may perform this incrementing the stage of each other object in the group and the updating in response to each object in the group reaching the final stage due to the incrementing. Thus, depending on the stages of other objects in a group, a single reward can conceivably cause a cascade of other rewards, leading to a group reward. This type of mechanism may be referred to generically as cascading rewards, and other variations of such rewards are also contemplated.

Again following the flower garden example discussed above, in one exemplary embodiment, flowers may grow in groups of the same flower type. Groups may vary in size, e.g., from a minimum of three in a group upwards. As explained above, the groups may be significant because of the development/reward scheme of the exercise. For example, in one embodiment of group rewards, when all the flowers in a group reach the last (fourth) stage of growth, a group reward, which may also have multiple stages of growth, may occur in proximity to the grouping, and all the flowers may be returned to their initial, pre-growth state in a new pot.

Additionally, cascading reward/growth may occur. For example, when a flower reaches the final (e.g., fourth) stage of growth, all the other flowers in the group may grow or increment a stage in a cascading effect. For example, in one embodiment, two forms of cascading growth may occur:

1. when a flower reaches the final (e.g., fourth) stage of growth, all the flowers nearest to it may grow a stage. If this causes another flower in this group to reach the fourth stage, this flower may cause another cascade in the group, etc.; and 2. when all the flowers in a group reach the highest stage of growth and a group reward occurs, all the flowers in all groups in the same stimulus presentation area may grow a stage.

However, no additional cascading may occur in the other groups beyond the single stage of growth (e.g., if a flower reaches the fourth stage, it will not cause further growth in that group).

In some embodiments, the notion of stasis levels may be implemented in the exercise, which, in contrast to development stages, reflect or correspond to a lack of development with respect to objects. More specifically, the method may include: in response to determining that no stages for any objects in a group have been incremented for a first specified number of trials, graphically indicating a first level of stasis for the group. In other words, objects that fail to develop for some specified number of trials may start to decline. For example, following the flowering plant examples above, if the flower does not progress for a specified number of trials, wilting may occur. This effect may increase with subsequent lack of development or progress. For example, in one embodiment, in response to determining that no stages for any objects in a group have been incremented for a further second specified number of trials, the method may graphically indicate a second level of stasis for the group, and decrement the respective stages of objects in the group that are not at the initial stage. Similarly, in response to determining that no stages for any objects in a group have been incremented for a further third specified number of trials, a next level of stasis for the group may be graphically indicated, and the respective stages of objects in the group that are not at the initial stage may be decremented. Then, for each further third specified number of trials in which no stages for any objects in a group have been incremented, the method may include graphically indicating a next level of stasis for the group, and decrementing the respective stages of objects in the group that are not at the initial stage.

Note that in various embodiments, the above first, second, and third specified numbers of trials may be the same, or may be different. In other words, the conditions for increasing the stasis level (e.g., wilt count) for an object may be different for different stasis levels, or may be constant. Thus, for example, in one exemplary embodiment where the numbers of trials without development differs depending on the current stasis level, a lack of development in a group for 20 trials may cause an initial stasis level, which may simply be a warning that developmental decline is imminent, pending further lack of development in the group. Then, after a second number of trials with no development, e.g., 28 trials, the stasis level for the group may be incremented. Subsequently, for each successive (of a specified) number of trials for which no development occurs, e.g., for every 8 trials thereafter, the stasis level for the group may be incremented. In this exemplary embodiment, every stasis level after the initial level causes the development stage of each object to be decremented. Note that such decrementing may be limited in that the development stage of objects can be decremented down to, but not past, the initial stage for each object. Now, in response to determining that all objects in a group are at the initial stage the method may remove the graphical indication of stasis for the group. Thus, when all objects have been set back to their initial stages, the stasis levels may be removed or reset to none. Additionally, in some embodiments, for a group with a stasis level, in response to incrementing the stage of at least one object in the group, the level of stasis of the group may be reset to none.

There may be other situations that result in removal or resetting of the stasis level for a group. For example, in response to a configuration where the stimulus presentation area is decreased, i.e., where the active stimulus presentation area becomes smaller, for any group with a stasis level in deactivated areas, the graphical indication of stasis for the group may be removed, i.e., the stasis level may be reset to none.

The following applies the above concepts to an embodiment of the flower garden example, where correct responses ending on a flower in a group results in growth in that group, and where if no growth occurs (correct responses or cascading growth) for a specified number of trials the flowers in the group may begin to wilt, e.g., according to the below exemplary scheme.

Wilting Marker—If no growth occurs in a group for a number of trials (see Table 2 below), a marker indicating that the group will soon start to wilt appears in the group reward area and remains until growth occurs in the group.

First Wilt—If no growth occurs for an additional number of trials (see table below) all flowers in that group will reverse one stage of growth. If a flower had three buds it will go back to two buds. The wilting marker will change to a more wilted state.

Continued Wilting—After the initial wilting, more wilting will occur after a periodic number of trials (see table below) with no correct response in the group. The wilting marker will continue to change to a more wilted state.

Final Wilt—Wilting ends when the pots return to the initial stage (on side) and the wilting indicator is removed.

No Wilt—Wilting indicators do not appear on groups with all flowers in the initial stage (pots on side)

Resetting Wilt Count—When a correct response or cascading growth occurs in a group the wilt count for that group will be reset to 0.

Inactive Areas—When the configuration changes from the largest stimulus area to the smallest (e.g., configuration 4 to 5), all wilt indicators in the newly inactive areas are removed and only those in the active central area remain.

The following table presents an exemplary schedule for wilting:

TABLE 2

Wilting Schedule

| | Number of trials with no correct responses in group |
|---|---|
| Wilting indicator appears | 20 |
| First wilting | 28 |
| Additional wilting | every 8 trials after first wilting |

Note, however, that the wilting scheme and schedule are intended to be exemplary only, and that other stasis level schemes and schedules may be used as desired.

As mentioned above, in addition to the rewards for individual objects (which may include cascading rewards within a group, or even across groups), in some embodiments, the exercise may also include group rewards. Each group may be progressable through multiple group stages, including an initial group stage and a final group stage, and presenting a group reward may include incrementing the group stage of the group. For example, for a first group reward for the group, this may include setting the group stage of the group to the initial group stage, and displaying an icon proximate to the group indicating the group stage of the group. Moreover, in some embodiments, in response to incrementing the group stage of the group, the stage of objects in all other groups in the stimulus presentation area may be incremented. Thus, cascading rewards may propagate throughout the active stimulus presentation area, greatly leveraging the participant's control of rewards and progress in the exercise.

Figure 8:
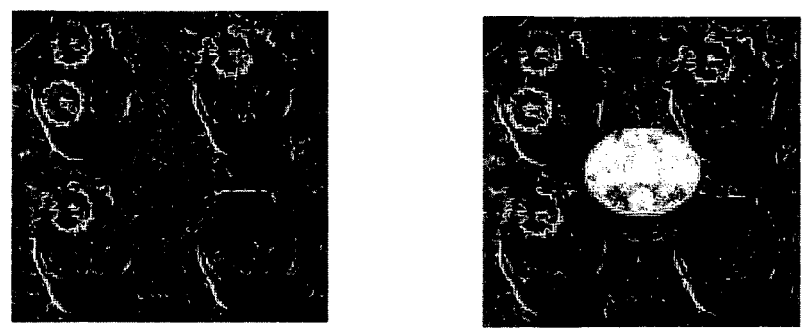
FIG. 8 illustrates an exemplary series of group stages for a group reward, according to one embodiment.
Figure 8:
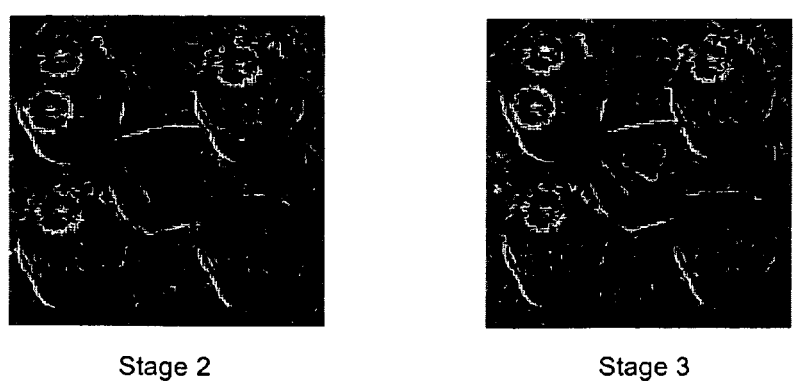

FIG. 8 illustrates exemplary icons representing a succession of group stages, according to one embodiment, where the group stages include an initial state (with icon so labeled), and three successive stages, e.g., corresponding to the number of times the participant has progressed all the objects in the group to the final stage. Note that in the embodiment shown, in addition to the flowers (representing objects in the group), each icon representing a group stage (beyond the initial state) includes a respective group reward icon in the middle of the group. In this exemplary embodiment, the group reward icon illustrates a portion of a central reward icon, in this particular case, a portion of a fountain. As described below, in some embodiments, once a group has progressed to the final stage, a central reward may be presented, which may involve the group reward icon being added to a central reward icon (and removed from the group icons). Of course, in other embodiments, other group and group reward icons may be used as desired.

The following applies the above concepts to an embodiment of the flower garden example, where, when all the flowers in a grouping reach the last (fourth) stage of growth, a group reward may appear in proximity to the group. The group rewards may have three stages of growth:

stage 1: initial, where in the flower garden, a stepping stone appears;

stage 2: middle, where in the flower garden, a section of a fountain appears on the stepping stone; and stage 3: final, where in the flower garden, a more elaborate section of a fountain appears on the stepping stone and is added to the central reward icon, e.g., a fountain.

Each stage of growth of the group reward may occur after all the flowers in the grouping reach the fourth stage of growth, after which they may return to their initial pre-growth state. Note that in one embodiment, group rewards in the outermost section of the garden may be power-ups, described below.

As noted above, in some embodiments, group rewards may contribute to a central reward. For example, the icon indicating the group stage of the group may include a portion of a central object icon that corresponds to a central object. Then, in response to a group achieving the final group stage, a central reward may be presented, in which the icon indicating the group stage of the group may be added to the central object icon and the central object icon may be displayed, e.g., in the center of the active stimulus presentation area. Moreover, the central object may be progressable through multiple central object stages, including an initial central object stage and a final central object stage. Thus, presenting a central reward may include incrementing the central object stage, including displaying the central object icon to indicate the central object stage of the central object. Incrementing the central object stage may include: for a first central reward for a level, setting the central object stage to the initial central object stage, and displaying the central object icon indicating the central object stage of the central object may include: for the final central object stage, displaying a complete central object icon for the level. In other words, as group rewards are presented, they may contribute additively to the assembly of a central object, where each group reward icon is or illustrates a respective portion of the central object icon. For example, following the flower garden example from above, group rewards may include respective portions of a central fountain for the garden, where the final stage of the central object results in a complete fountain, e.g., with corresponding animations of water.

The following applies the above concepts to an exemplary embodiment of the flower garden example, where each time a group reward reaches its third stage of growth, it may be added to the central reward, e.g., a fountain. If two or more groups reach the third stage of growth simultaneously (due to cascading growth), each may contribute to the central reward.

The fountain may have 36 stages of growth before it is complete. As each stage of growth (a piece from the flower groups) is added, the fountain may flow with more elaborate water works. The fountain may have 3 levels with 12 stages of growth (decoration) per level. Once the fountain has completed all 36 stages, the fountain may remain in its finished state, but may still animate to celebrate the reward.

When the exercise approaches the end of a level, in the last configuration or so, the fountain may be completed so that participants can have the satisfaction of seeing the completed fountains at each level. Note that the cascading effect may be important to speeding the development of the garden and the fountain. Without the cascading effect the following number of trials would be required for each stage of growth.

Trials to get to final (fourth) stage of flower growth: 4

Trials to complete a flower group with four flowers and get a group reward: 16

Trials to get to the final (third) stage of a group rewards growth: 48

Trials to complete fountain: 576

These numbers may be significantly reduced due to cascading growth. Additionally, these numbers may be adjusted based on the number of sections of the fountains or stages of growth of the reward or flowers, among others.

In some embodiments, at least one of the group rewards may include a power-up, i.e., a reward that includes some special action or behavior that benefits or entertains the participant. For example, a power-up may include one or more of: random rewards for a plurality of objects, presentation of one or more animations, removal of a distractor from at least one sequence, repetition of the visually presenting a temporal sequence for at least one sequence, or suspension of ceasing to display the graphical element for at least one sequence. Thus, a power-up may provide an unexpected or atypical reward to the participant, and so may serve to maintain interest and engagement in the exercise.

The following applies the above concepts to an exemplary embodiment of the flower garden example, where, when all the flowers appear in a grouping in the outer ring of the garden (which may only be active every fourth configuration) the group reward may be a power-up. The exercise may alternate randomly between the two types of power-ups, game power-ups, and task power-ups.

Exemplary game power-ups contemplated for different levels may include (but are not limited to):

Level 1: Automatic sprinkler system that waters entire garden, where four sprinklers appear, followed by random growth and cascading;

Level 2: Garden workers (gnomes) that work in the garden encouraging growth, where 2-5 gnomes appear, followed by random growth and cascading rewards; and Level 3: A dragon fly flies about the garden, where one dragon fly appears, followed by random growth and cascading.

Other exemplary game power-ups may include cows that contribute nutrients to the garden, a can of lady bugs that eat aphids in the garden, moles that aerate soil, etc.

Exemplary task power-ups may include:

Second chance, in which the participant can continue a trial even when a wrong match is selected;

Reveal stimuli, e.g., in which stimuli are displayed throughout a trial;

Repeat stimuli, in which stimuli in a sequence are presented again; and

Remove a distractor, in which a non-matching stimulus is removed from a sequence.

Note that the above are meant to be exemplary only, and that any other power-ups may be used as desired.

FURTHER EXEMPLARY EMBODIMENTS

The below describes exemplary embodiments of further, e.g., more complex, versions of the guided eye movement exercise, although it should be noted that various aspects of the embodiments described herein may be utilized with respect to any other embodiments of the exercise as desired.

Summarizing an exemplary embodiment of the method described above with reference to FIG. 3, a trial may include:

Trial Initiation: The participant may initiate a trial by clicking a start button.

Stimulus Presentation: Stimuli (e.g., 3-7 stimuli) may be presented in succession in various locations on the screen. After each stimulus presentation a marker may remain on screen to indicate where the stimulus appeared and to provide a response button.

Participant Response: The participant may click on the stimulus markers to identify where the matching stimuli appeared.

After each correctly identified matching stimulus, reward feedback may be given, e.g., in the form of a "ding" sound and, possibly a graphical effect, e.g., a particle generator animation. If all matching stimuli were correctly identified, an indication of success, e.g., a "ding" sound, may occur and the stage of the corresponding object may be incremented, e.g., the flower under the last stimulus clicked may grow. Then, the start button may be displayed again.

After a first incorrect response, an indication of failure may be presented, e.g., a "thunk" sound may be played and the trial ended. The stimuli from the previous trial may be revealed for a specified period, e.g., for a period of 3000 ms, so the participant can see where the match occurred. If the participant clicks anywhere on the screen during this period, the stimuli may be removed and the start button may appear. After the specified period, e.g., after 3000 ms, the stimuli may be removed and the start button may be displayed again.

Note that in some embodiments, shortcuts may also be used to navigate the exercise, e.g.: the up-arrow key may be used to start the trial, the left and right arrow keys may be used to move among the response buttons, and the down arrow key may be used to select each stimulus. Of course, any other shortcuts may be used as desired.

As mentioned above, the exercise may include performing a plurality of trials under each of a plurality of configurations, where each configuration specifies one or more attributes of the plurality of graphical elements or their presentation. In one embodiment, each of the plurality of configurations may specify one or more of: stimulus presentation area, where the stimulus presentation area includes at least a subset of the visual field, minimum number of potential stimulus locations, number of graphical elements in the sequence, number of matching graphical elements in the sequence, stimulus set, including a set of graphical elements from which the plurality of graphical elements of the sequence are selected, where the graphical elements of the stimulus set have a specified discriminibility (as noted above), gap, which refers to a specified amount of time between ceasing display of a graphical element and displaying a next graphical element in the sequence (and which may also be referred to as an inter-stimulus-interval (ISI)), and emphasis level, specifying a degree of distinguishability of the presented graphical elements with respect to a background of the visual field (as also noted above). Moreover, in some embodiments, various of these configuration attributes may be varied according to some specified relationship. For example, in one embodiment, performing a plurality of trials under each of a plurality of configurations may include co-varying the stimulus presentation area with the minimum number of potential stimulus locations, and/or co-varying the gap with the emphasis level. Of course, any of these attributes (e.g., pairs or groups) may be varied according to any relationships desired. Each configuration may include some specified number of trials. For example, in one exemplary embodiment, each configuration may include 30 trials, although other numbers of trials may be used as desired.

The following table presents an exemplary configuration scheme, where example value ranges are given for each of the above attributes:

TABLE 3

| Category | Values |
| --- | --- |
| Stimulus presentation area | 300 × 300, 400 × 400, 500 × 500, 600 × 600 |
| Minimum number of potential stimulus locations (co-varied with above). | 16, 32, 48, 68<br>NOTE: these numbers may change if required for a given layout. |
| Number of targets to match | 2 of 3, 3 of 5, 3 of 6 |
| Stimulus Set | Set 1, Set 2, Set 3 |
| Gap (co-varied with emphasis) | ½ presentation time, ¼ presentation time, none |
| Emphasis level (co-varied with gap) | Level 1, 2, and 3 |

It should be noted that the above values and value ranges are meant to be illustrative only, and are not intended to limit the configurations or configuration scheme to any particular set of attributes or values.

Note that, as indicated above, the adaptive dimension may be or include the presentation time of each stimulus, where the total presentation time may vary based on the number of stimuli and the type of stimulus presentation. The types of stimulus presentation may include gap and no gap presentations, and the type used for a trial may be determined by the configuration. For example, in a gap presentation, stimuli may be presented sequentially with a gap between each presentation, which makes the task easier, whereas in a no gap presentation, stimuli may be presented sequentially with no gap, which makes the task harder. In one embodiment, the gap may itself be specified by the configuration. For example, in one embodiment, there may be two gap lengths depending on the configuration: ½ stimulus presentation time or ¼ stimulus presentation time, although other gaps may be used as desired. Thus, total presentation time for a stimulus sequence may be equal to the stimulus presentation time+gap (½ stimulus presentation time OR ¼ stimulus presentation time))×the number of stimuli, and so may be dependent upon the configuration in effect. Conversely, in a no gap presentation, total presentation time may be equal to the stimulus presentation time×the number of stimuli.

Moreover, in some embodiments, bounds for the presentation times may be specified. For example, in one exemplary embodiment, a minimum stimulus presentation time may be specified as 1 frame, e.g., the time required for one visual frame to be presented, e.g., $\frac{1}{25}$ of a second (or some other characteristic frame time for the system), a maximum stimulus presentation time may be specified as 3000 ms, and an initial value of the stimulus presentation time may be specified as 630 ms, although other values may of course be used.

In some embodiments, performing a plurality of trials under each of a plurality of configurations may include performing a plurality of trials under each of a plurality of configurations of varying difficulty. For example, a plurality of trials may be performed under each of a plurality of increasingly difficult configurations for each of a succession of levels, wherein each level specifies one or more attributes of the stimuli (the graphical elements) and/or the presentation. For example, in one embodiment, each level may specify one or more of: a respective visual field layout and background, a respective emphasis level, and/or a respective stimulus type corresponding to the emphasis level.

In embodiments directed to gardens, the backgrounds may illustrate various gardens with each level increasingly complex to view the stimuli against. In other words, backgrounds may be used progressively to make distinguishing the stimuli from the background more difficult. For example, in one exemplary embodiment, the gardens may include:

Level 1—a flower garden called Grass Valley;
Level 2—an English garden called Windsor Castle; and
Level 3—a Japanese garden called Sakura Palace.

Other exemplary gardens contemplated may include a vegetable garden, and a rose garden, among others.

Note that for a given garden (visual field layout with background), active and inactive stimulus presentation areas may be indicated graphically. For example, referring again to FIG. 5, note that the inactive areas 504 are shaded or "grayed out". The size of the active stimulus presentation area may change with each configuration, and so the part of the garden that is inactive in any given configuration may be shaded. Examples of exemplary visual field layouts are described below with reference to FIGS. 11A-11B, 12A-12B, and 13A-13B.

Figures 9, 10:
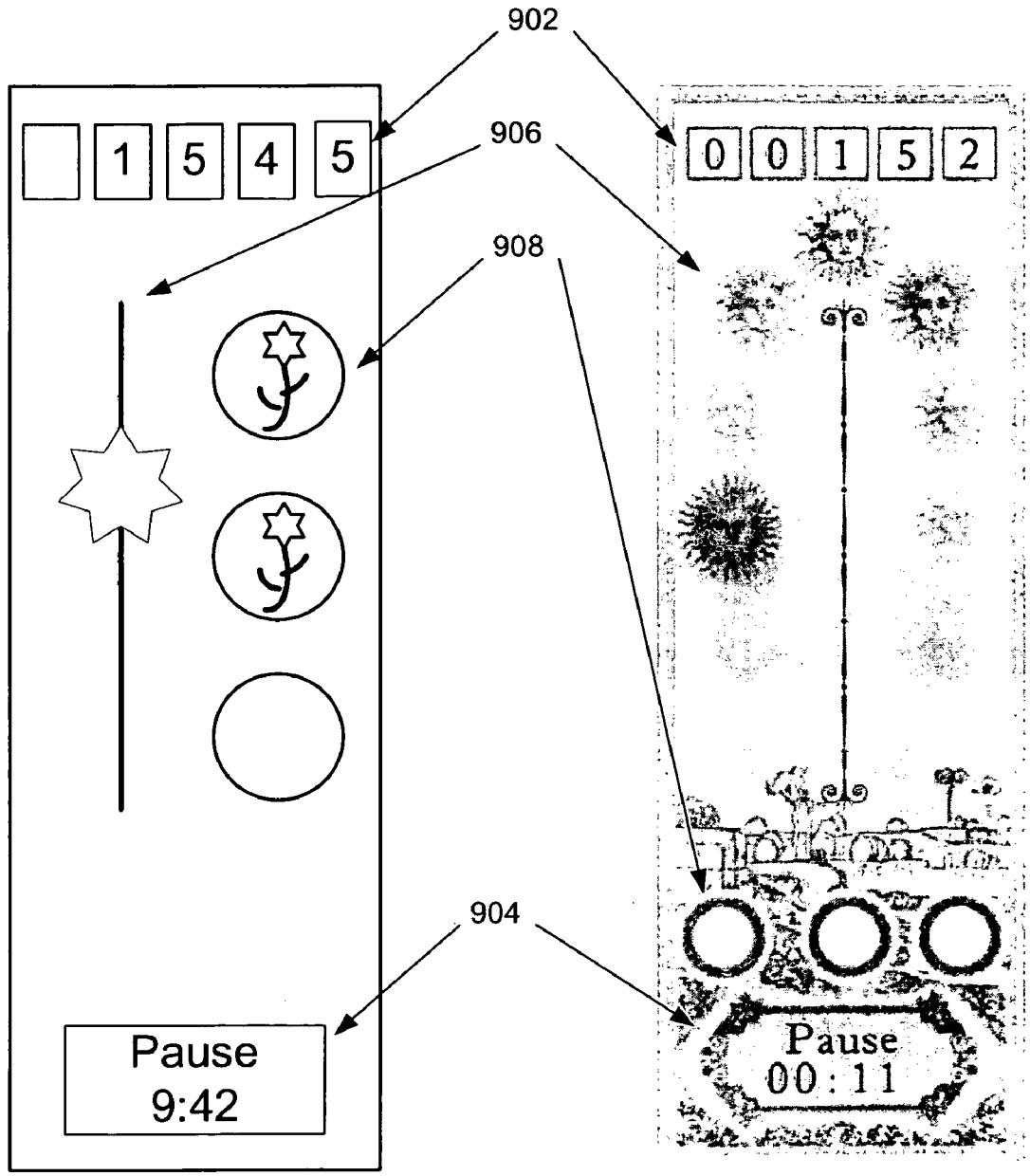
FIG. 9 illustrates a sidebar layout for a guided eye movement exercise, according to one embodiment.
FIG. 10 illustrates an exemplary embodiment of the sidebar of FIG. 9.

In preferred embodiments, the GUI may include a display area whereby feedback may be presented to the participant regarding progress through the exercise. FIGS. 9 and 10 illustrate an exemplary embodiment of such a display, referred to herein as a sidebar, where FIG. 9 illustrates a simplified version, and FIG. 10 illustrates a more sophisticated version. In various embodiments, the sidebar may display any of a variety of items, including, for example, one or more of: a score indicator 902, a pause/timer button 904, a configuration progress indicator 906, and a trial step indicator 908, among others.

For example, the score indicator 902 may indicate the current score for the configuration, which in some embodiments may be reset at the end of each configuration. Any of various scoring schemes may be used as desired. For example, in one exemplary embodiment, two points may be awarded for each correct response, ten points may be awarded for each group reward, and twenty points may be awarded for each central reward achieved.

The pause/timer button 904 may allow the participant to pause and resume the exercise. The configuration progress indicator 906, in these two embodiments, a rising and setting sun, may indicate the participant's progress through the configuration. For example, in such a positional indicator, the sun's (or other object's) position may be incremented after each correct response. In some embodiments, the sun (object) may rise vertically for half the configuration and then drop down in the second half. The trial step indicator 908 may indicate both the number of matches to be found in the current trial's sequence, and the number of matches indicated so far. Thus, for example, in one embodiment, depending on the number of matches in the current trial, two or three circular spaces may be present on the sidebar. These spaces may fill in with an icon representing the current stimulus as each step of the trial is completed correctly. Of course, in other embodiments, the sidebar may utilize any other indication schemes as desired.

Additionally, in some embodiments the sidebar may include a task power-ups indicator (not shown), which may indicate the number of power-ups achieved so far, and may also indicate the number of power-up available in the current configuration, layout, etc.

Moreover, in some embodiments, the GUI may include a summary screen(s) or window(s), summarizing the participant's current progress through the exercise. For example, in one embodiment, the summary screen (or window(s)) may include one or more of: page or configuration number, indicating the current (or most recently completed) configuration, a points summary, indicating all items that contributed to points earned in the configuration, the number of correct responses achieved out of the total number of trials taken or performed, a map or other scheme indicating progress through the configurations, a next button, allowing the user to navigate to the next window or page, and possibly an achievements indicator, for indicating special achievements of the participant, e.g., for the current configuration.

One example of a points summary may include information regarding the number and type of rewards presented in the exercise, e.g., for a particular level, or for the overall exercise. As discussed above, in some embodiments, the exercise may award points for each stage of growth of an object, e.g., a flower. In addition, points may be awarded when all objects, e.g., flowers, in a group reach the final stage of growth and when a piece (group reward) is added to the central reward (e.g., the third time all flowers in a group reach the fourth or final stage of growth).

For example, the following table presents one exemplary points scheme:

TABLE 4

| Event | Points Awarded |
|---|---|
| Correct response | 2 |
| When group reward achieved (all flower in a group reach fourth stage) | 10 |
| When central reward achieved | 20 |

The following illustrates one exemplary points summary screen format:

| Number | Rewards | Points |
|---|---|---|
| 87 | Flowers | 174 |
| 12 | Flower Groups | 120 |
| 2 | Fountain Pieces | 40 |
| Total: | | 334 |

Matched: 30 out of 36.

Such a summary may thus indicate to the participant the respective mechanisms whereby points have been awarded, and may thus be used by the participant to refine his or her tactics to improve performance (at least scorewise). Of course, the above summaries and schemes are exemplary only, and are not intended to limit the information or its display to any particular form, content, or appearance.

Exemplary Visual Field Layouts

FIGS. 11A-11B, 12A-12B, and 13A-13B illustrate exemplary visual field layouts, according to one embodiment.

More specifically, these pairs of figures illustrate layouts corresponding to respective emphasis levels, which, as noted above, specify or correspond to the distinguishability of the visual stimuli with respect to the background of the visual field.

Figure 11A:
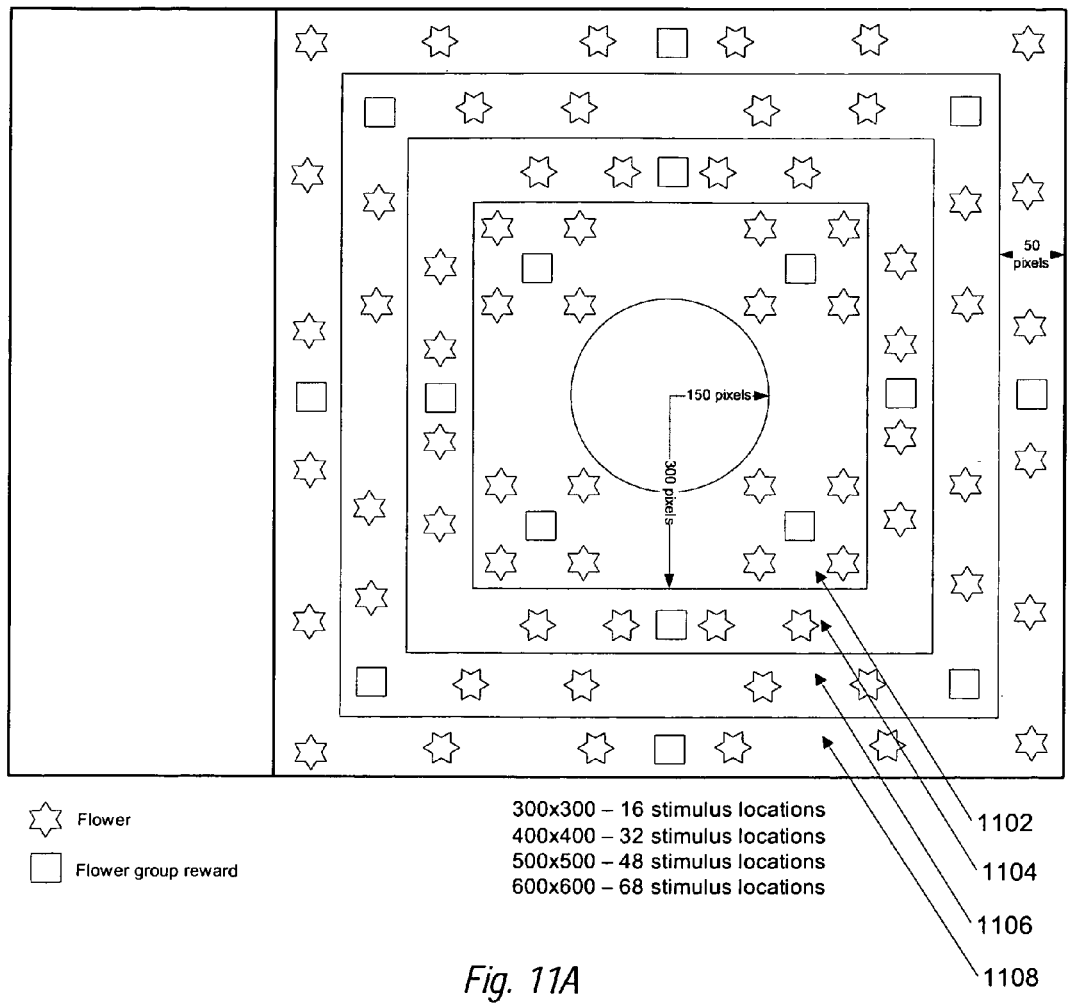
FIG. 11A illustrates an exemplary visual field layout for a guided eye movement exercise, according to one embodiment.

FIG. 11A illustrates an exemplary visual field layout for level 1, e.g., for a visual emphasis level of 1. As may be seen, the layout includes a series of concentric borders delineating increasing stimulus presentation areas, each of which includes a specified number of potential stimulus locations, indicated here by stars, as well as potential group reward locations, indicated by squares, and corresponding to respective groups of the potential stimulus locations. These areas may thus facilitate progression through configurations specifying increasing stimulus presentation area, as well as increasing values for the minimum number of potential stimulus locations. For example, as indicated by the legend at the bottom of FIG. 11A, the central region (central square area) 1102 includes 16 (potential) stimulus locations, the next region 1104 (which also includes the central region 1102) includes 32 stimulus locations (i.e., the original 16 in the central region 1102 plus 16 additional locations), the next region 1106 (which also includes regions 1102 and 1104) includes 48 stimulus locations (i.e., the original 16 in region 1102 plus the 16 locations of region 1104, plus 16 additional locations), and finally, the last and largest region 1108 (which also includes regions 1102, 1104, and 1106) includes 68 stimulus locations (i.e., the original 16 in region 1102 plus the 16 locations of region 1104, plus the 16 locations of region 1106, plus 20 additional locations). Of course, in other embodiments, other numbers of locations, groups, regions, etc., may be used as desired.

Figure 11B:
FIG. 11B illustrates an exemplary screenshot of the visual field of FIG. 11A, according to one embodiment.

FIG. 11B is an exemplary screenshot of a visual field according to the layout of FIG. 11A. As may be seen, each potential stimulus location is denoted by a respective flower pot turned on its side, and the arrangement and background are very simple, and thus, minimally distracting to the participant. In other words, this layout, corresponding to a level 1 visual emphasis, facilitates the participant's distinguishing visual stimuli (the presented graphical elements) from other aspects of the visual field.

Figure 12A:
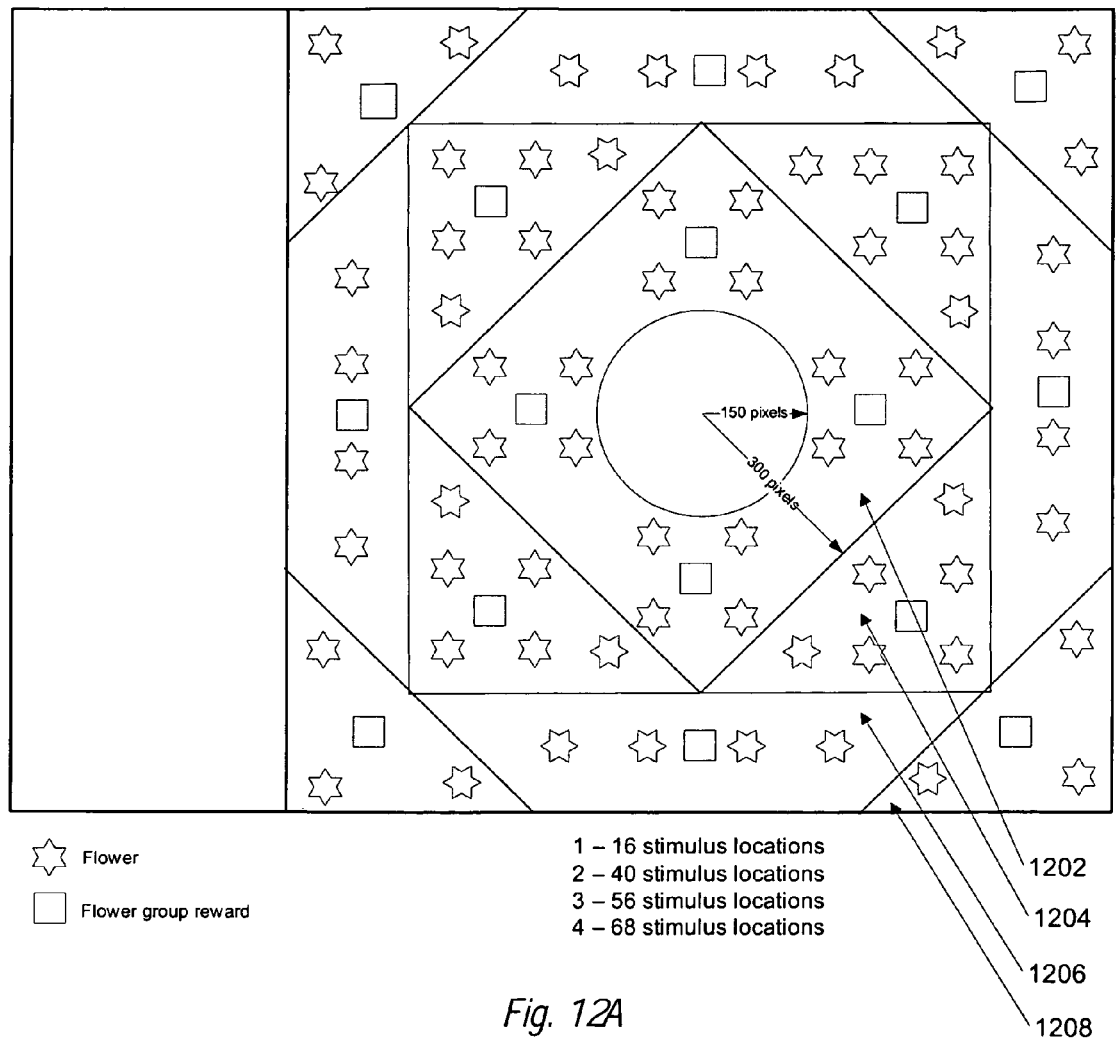
FIG. 12A illustrates another exemplary visual field layout for a guided eye movement exercise, according to one embodiment.

FIG. 12A illustrates an exemplary visual field layout for level 2, e.g., for a visual emphasis level of 2. As may be seen, the layout includes a different, more complex, series of concentric borders delineating increasing stimulus presentation areas. As with the layout of FIGS. 11A and 11B, these areas may facilitate progression through configurations specifying increasing stimulus presentation area, as well as increasing values for the minimum number of potential stimulus locations. Note that in this layout (with visual emphasis level 2), the progression of stimulus locations increases with increasing stimulus presentation area in a different manner than with that of FIGS. 11A and 11B. For example, as indicated by the legend at the bottom of the figure, the smallest, innermost, region 1202 includes 16 stimulus locations, the next region 1204 (which includes the four "corners" adjacent to the region 1202) includes 40 stimulus locations, the next region 1206 (which includes the four corners adjacent to the region 1204, and the final and largest region (which includes the four corners adjacent to region 1206, which are also the corners of the entire layout) includes 68 stimulus locations. Note that this layout includes the same total number of stimulus locations, but distributes them differently among the successive areas or regions.

Figure 12B:
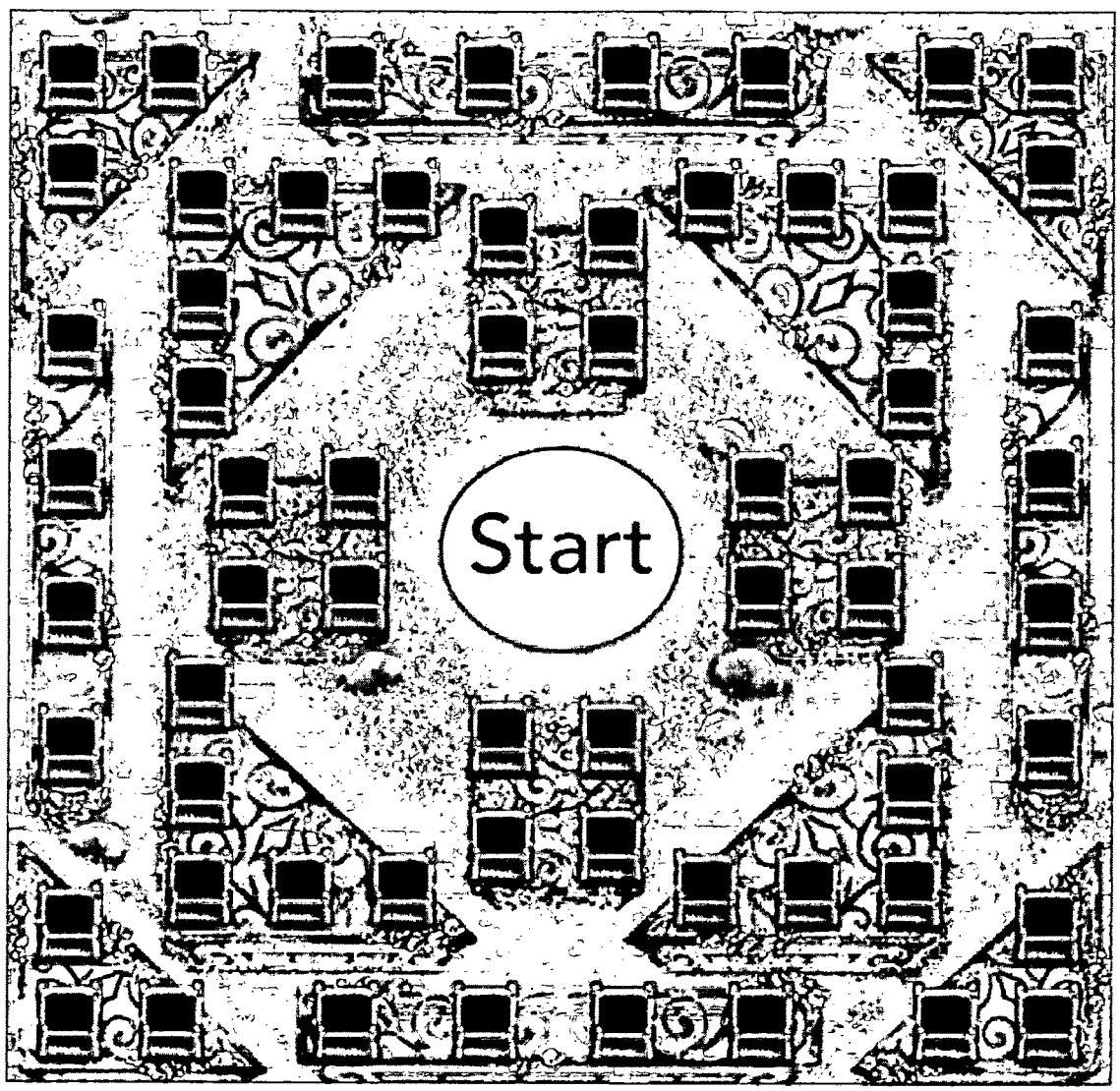
FIG. 12B illustrates an exemplary screenshot of the visual field of FIG. 12A, according to one embodiment.

FIG. 12B is an exemplary screenshot of a visual field according to the layout of FIG. 12A. As may be seen, each potential stimulus location is denoted by a respective flower pot, but where the flower pots are more fancy than those of FIG. 11B, thus indicating a higher level of progress in the exercise. Moreover, compared to the layout of FIGS. 11A and 11B, the arrangement and background are more complex, and thus more distracting to the participant. In other words, this layout, corresponding to a level 2 visual emphasis, makes it more difficult for the participant to distinguish visual stimuli (the presented graphical elements) from other aspects of the visual field. Note, for example, that the background includes various distracting elements, such as stones and foliage distributed over the visual field.

Figure 13A:
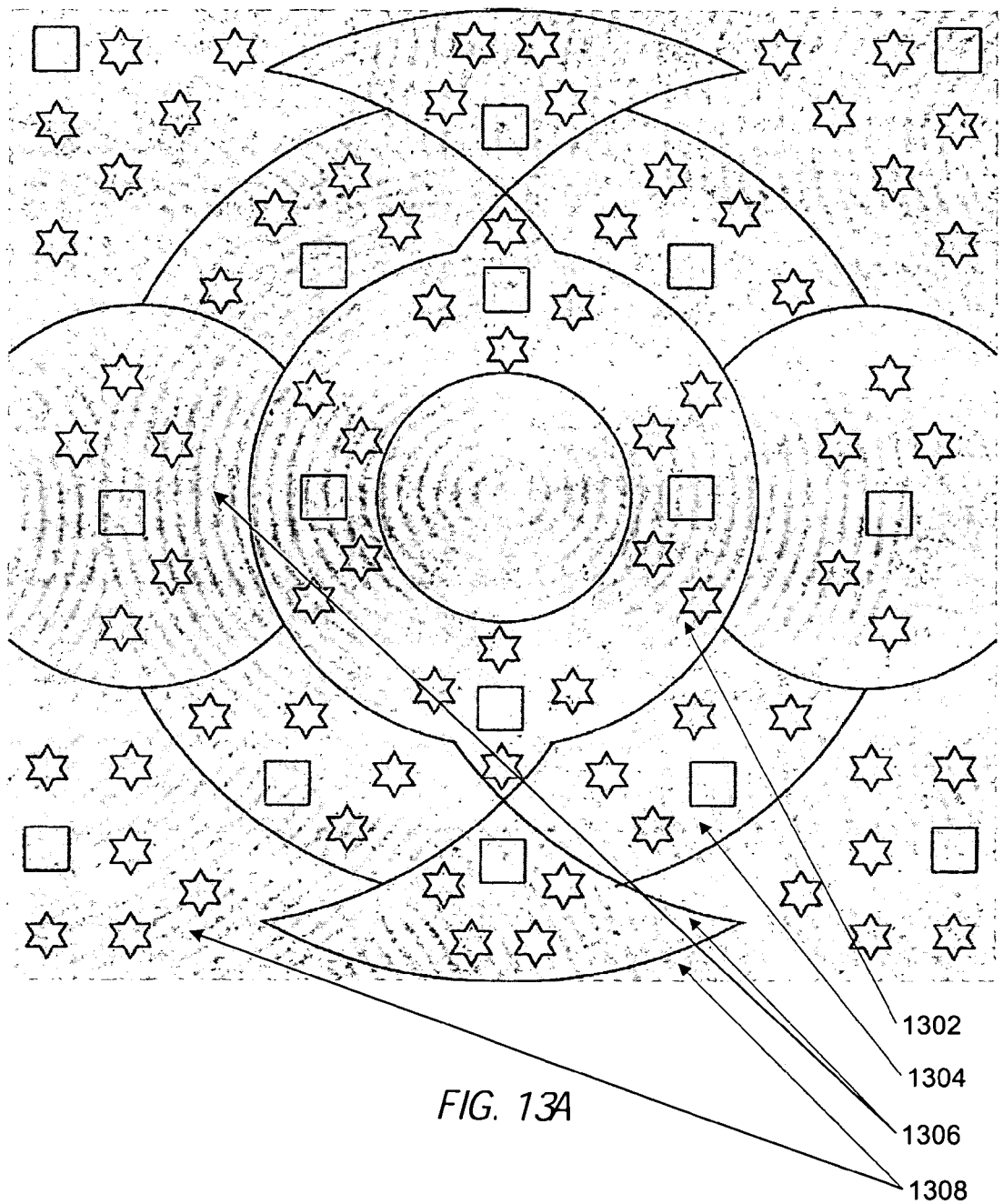
FIG. 13A illustrates yet another exemplary visual field layout for a guided eye movement exercise, according to one embodiment.
Figure 13B:
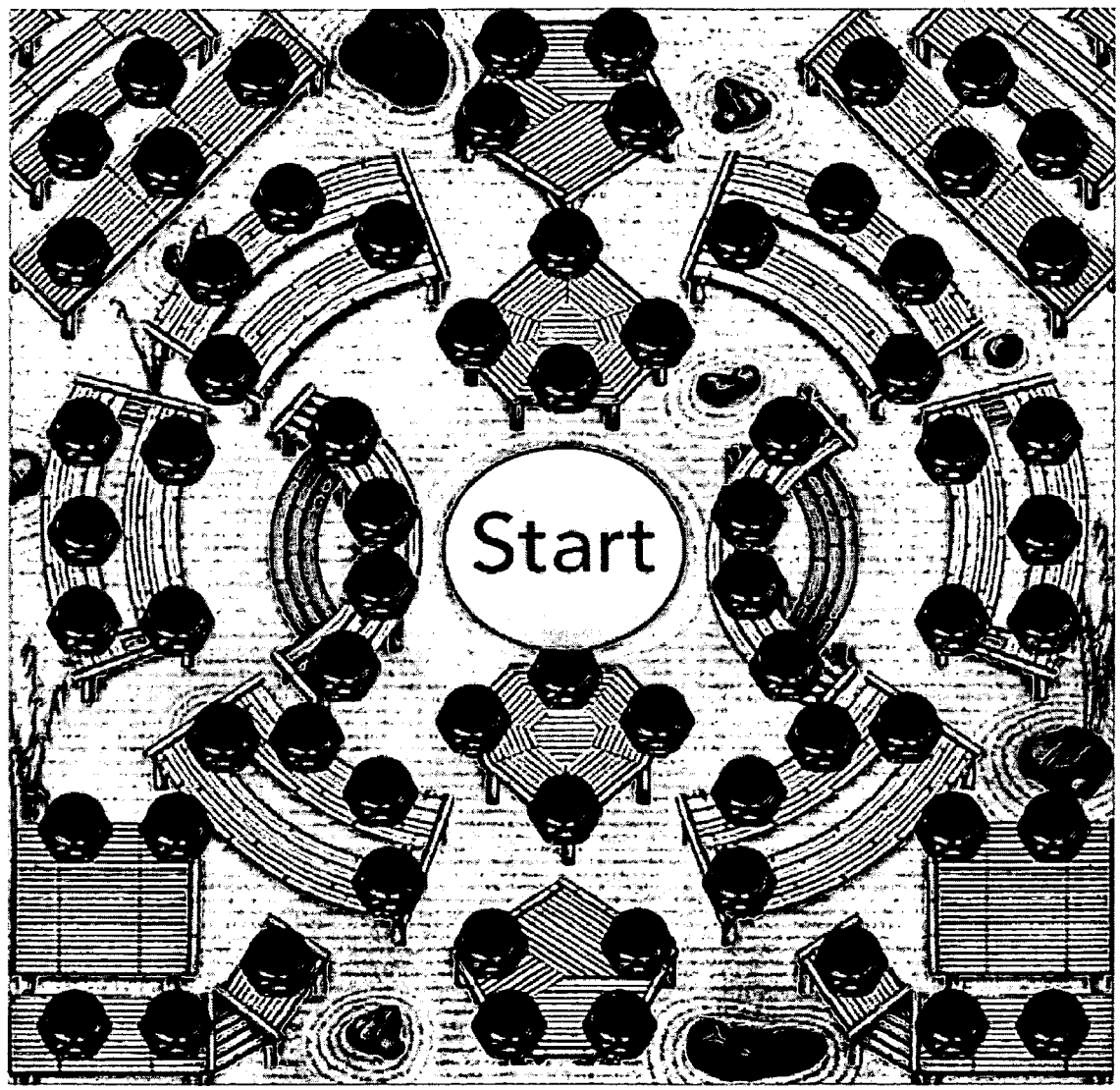
FIG. 13B illustrates an exemplary screenshot of the visual field of FIG. 13A, according to one embodiment.

FIG. 13A illustrates an exemplary visual field layout for level 3, e.g., for a visual emphasis level of 3. As may be seen, the layout includes an even more complex series of borders delineating increasing stimulus presentation areas or regions. Note that in this layout (with visual emphasis level 3), the successive regions or areas (indicated respectively by 1302, 1304, 1306, and 1308) are quite complex, and, as illustrated in FIG. 13B, which is an exemplary screenshot of a visual field in accordance with the layout of FIG. 13A, result in increased difficulty with regards to the participant keeping track of the different groups of objects/stimulus locations. Note that the background of FIG. 13A also includes various distracting details such as rocks, benches, etc., which further complicates distinguishing stimuli from background objects, and that the stimulus location arrangements may make the task of remembering what image was presented at a particular location more difficult, as well.

As may be seen in these figures, each level, i.e., visual emphasis level, is characterized by the degree of difficulty with which a participant may distinguish presented stimuli from the background, and with which the participant may remember locations of particular stimuli.

It should be noted, however, that other layouts and backgrounds may be used as desired, the above being exemplary only.

Adaptive Stimulus Modification

As mentioned above, in preferred embodiments, the modification or adjustment of the duration of each visual presentation of each graphical element in the sequence may be performed repeatedly over the course of the exercise based on the correctness or incorrectness of the participants responses. The adjustments may generally be made to increase the difficulty of the stimulus or trial when the participant answers correctly (e.g., shortening the duration or presentation time), and to decrease the difficulty of the stimulus or trial when the participant answers incorrectly (e.g., increasing the duration or presentation time). Moreover, the adjustments may be made such that a specified level of performance, i.e., level of success, is approached and substantially maintained during performance of the exercise. For example, based on the participant's responses, the duration may be adjusted to substantially achieve and maintain a specified success rate, e.g., 85% for the participant, although other rates may be used as desired.

As also mentioned above, in preferred embodiments, the adjustments may be made using a maximum likelihood procedure, such as a QUEST (quick estimation by sequential testing) threshold procedure, or a ZEST (zippy estimation by sequential testing) threshold procedure, described below, such procedures being well-known in the art of stimulus threshold determination. In some embodiments, these adjustments (e.g., using ZEST) may be determined on a per configuration basis. In other words, for each configuration, the sequences may be presented (and adjusted) in accordance with a maximum likelihood procedure (e.g., ZEST) applied to trials under that configuration.

Moreover, as described below, the repeating may also include performing threshold assessments in conjunction with, or as part of, the exercise. In other words, the method of FIG. 3 may include assessing the participant's performance a plurality of times during the repeating. Additionally, the assessing the participants performance a plurality of times may be performed according to the maximum likelihood procedure, e.g., using a 2-stair maximum likelihood procedure. A description of such threshold determination/assessment is provided below.

Threshold Determination/Assessment

As indicated above, duration (or more generally, stimulus intensity) is an adjustable attribute of a presented stimulus (graphical element) whereby a trial in the exercise may be made more or less difficult. For example, in one embodiment, the stimulus intensity may be the duration of the stimulus presentation, i.e., the presentation time (possibly including the ISI), although other attributes of the stimulus may be used as desired. The term "threshold" refers to the value of the stimulus intensity at which the participant achieves a specified level of success, e.g., 0.9, corresponding to a 90% success rate. Thus, any other attribute or combination of attributes may be used as desired, the term stimulus intensity being intended to refer to any such adjustable attributes.

Exercise based assessments (i.e., threshold determination) are designed to assess a participant's threshold with respect to stimuli on a given exercise, and can be used to adjust stimulus presentation to (substantially) achieve and maintain a desired success rate for the participant, e.g., with respect to a particular exercise, task, or configuration. As will be described below, such threshold determination may also be used to assess or determine a pre-training threshold that can then be used to calibrate the program to an individual's capabilities on various exercises, as well as serve as a baseline measure for assessing the participant's performance periodically during an exercise. Such assessment may also serve as a baseline measure to which post-training thresholds can be compared. Comparison of pre-training to post-training thresholds may be used to determine the gains made as a function of training with the cognition enhancement exercise or tasks described herein.

As noted above, there are various approaches whereby such thresholds may be assessed or determined, such as, for example, the well known QUEST (Quick Estimation by Sequential Testing) threshold method, which is an adaptive psychometric procedure for use in psychophysical experiments, or a related method, referred to as the ZEST (Zippy Estimation by Sequential Testing) procedure or method, among others, although it should be noted that such methods have not heretofore been utilized in cognition enhancement training exercises using guided eye movement, as described herein.

The ZEST procedure is a maximum-likelihood strategy to estimate a subject's threshold in a psychophysical experiment based on a psychometric function that describes the probability a stimulus is detected as a function of the stimulus intensity. For example, consider a cumulative Gaussian psychometric function, $F(x-T)$, for a 10-alternative-forced-choice (afc) task with a 5% lapsing rate, with proportion correct (ranging from 0-1) plotted against presentation time of the stimulus (ranging from 15-3000 ms). As used herein, the term intensity (with respect to stimuli) refers to the value of the adaptive dimension variable being presented to the participant at any particular trial in a particular exercise. In other words, the intensity value is that parameter regarding the exercise stimuli that may be adjusted or adapted, e.g., to make a trial more or less difficult. For example, in preferred embodiments of the guided eye movement exercise, the intensity value is the duration or presentation time (e.g., in milliseconds) of the presented values of the sequence of graphical elements (possibly including the ISI). The threshold is defined to be the mean of the Gaussian distribution for a specified success rate—e.g., a value yielding some specified success rate, e.g., 52.5%.

The method may make some assumptions about the psychophysics:

1. The psychometric function has the same shape, except a shift along the stimulus intensity axis to indicate different threshold value.

2. The threshold value does not change from trial to trial.

3. Individual trials are statistically independent.

The primary idea of the ZEST procedure is as follows: given a prior probability density function (P.D.F.) centered around the best threshold guess, x, this P.D.F. is adjusted after each trial by one of two likelihood functions, which are the probability functions that the subject will respond "yes" or "no" to the stimulus at intensity as a function of threshold. Since the psychometric function has a constant shape and is of the form $F(x-T)$, fixing the intensity x and treating threshold T as the independent variable, the "yes" likelihood, $p=F(-(T-x))$, is thus the mirror image of the psychometric function about the threshold, and the "no" likelihood function is then simply $1-p$.

The P.D.F. is updated using Bayes' rule, where the posterior P.D.F. is obtained by multiplying the prior P.D.F. by the likelihood function corresponding to the subject's response to the trial's stimulus intensity. The mean of the updated (or posterior) P.D.F. is then used as the new threshold estimate and the test is repeated with the new estimate until the posterior P.D.F. satisfies a confidence interval criteria (e.g. standard deviation of posterior P.D.F.<predetermined value) or a maximum number of trials is reached.

In one example of the ZEST procedure, a single trial of a 10-afc experiment is performed, with x=100 ms duration (intensity) as the initial threshold guess. If the subject responds correctly, the next trial is placed at the mean of the corresponding posterior P.D.F., ~x=75 ms; if the response is incorrect, the next trial is placed at the mean of the corresponding P.D.F., ~x=150.

Thus, in some embodiments, a single stair ZEST procedure such as that described above may be used to adjust the intensity of the stimuli for the guided eye movement exercise during training. In contrast, in some embodiments, particularly with respect to the periodic assessments during the exercise (as opposed to the "per response" stimulus adjustment) a 2-stair ZEST procedure may be employed, where two independent tracks with starting values, preferably encompassing the true threshold, each running its own ZEST procedure, are randomly interleaved in the threshold seeking procedure. In addition to their individual termination criterion, the difference between the two stairs may also be required to be within a specified range, e.g., the two stairs may be constrained to be a predetermined distance apart. An exemplary implementation of this approach is described below with respect to the guided eye movement threshold assessment.

As used herein, the parameters required for ZEST may include the mean of the prior P.D.F. (threshold estimate), the standard deviation of the prior P.D.F. (spread of threshold distribution), the standard deviation of the cumulative Gaussian distribution (slope of psychometric function), the maximum number of trials to run, and a confidence level and interval. Additionally, in one embodiment, the trial-by-trial data saved for analysis may include: the track used, the stimulus intensity presented, the subject's response, the mean of posterior P.D.F., and the standard deviation of the posterior P.D.F., as well as any other data deemed necessary or useful in determining and/or assessing the participant's threshold.

Thus, in preferred embodiments, a maximum likelihood procedure, such as a ZEST procedure, may be used to adjust the stimulus intensity (e.g., duration) of the presented sequences during training (e.g., via a single stair ZEST procedure per configuration), and may also be used for assessment purposes at periodic stages of the exercise (e.g., via a dual stair ZEST procedure, describe below). In one embodiment, such assessment may occur at specified points during the exercise, e.g., at 0% (i.e., prior to beginning), 25%, 50%, 75%, and 100% (i.e., after completion of the exercise) of the exercise. An example of such assessment is now described.

A primary purpose of the guided eye movement threshold assessment is to determine the smallest stimulus intensity, e.g., duration, in a guided eye movement task that a person can respond correctly to above a statistical threshold. The guided eye movement assessment may be similar to the guided eye movement exercise with respect to visual presentation, where the differences between the assessment and the exercise lie (at least primarily) in the movement or progression through the task and the data that are obtained from this movement for the assessment. The procedure is designed to obtain a threshold, which is a statistical rather than an exact quantity. In one embodiment, for the purposes of this exercise, the threshold may be defined as the smallest stimulus intensity, e.g., duration of stimulus duration or presentation time (in milliseconds) for each value (possibly including the ISI), at which the participant will fail to respond correctly a specified percentage, e.g., 69%, 85%, 90%, etc., of all trials for the task. In a preferred embodiment, being a computer based task, the guided eye movement assessment may use the ZEST procedure to progress or move through the task, adjust the stimulus intensity (e.g., duration) for the sequence, and determine the statistical threshold.

As noted above, many aspects of the guided eye movement assessment may generally be similar, or possible even identical, to the guided eye movement exercise task with respect to visual presentation. However, some aspects of the guided eye movement exercise may not be necessary in the guided eye movement assessment. For example, with regard to the GUI, in some embodiments, GUI elements such as score indicator, bonus indicator, etc., may not be necessary, and so may be omitted. Features or assets that may remain the same may include the "ding", "thunk" and "chime" sounds (or equivalents) that play after a participant responds correctly or incorrectly. The assessment stimulus presentation may also be identical to the training version.

The following describes one embodiment of a 2-stair (dual track) approach for determining a psychophysical threshold for a participant, e.g., an aging adult, where the task is directed to perception of presented sequences, and where the stimulus intensity includes the stimulus presentation time (possibly including the ISI), also referred to as duration, although other attributes may be used as desired, the duration being exemplary only. Initially, first and second tracks may be initialized with respective durations based on an initial anticipated threshold, where the initial anticipated threshold is an initial estimate or guess of a duration corresponding to a specified performance level of the participant, e.g., a stimulus duration at which the participant fails to respond correctly some specified percentage of the time, e.g., 69%. For example, in one embodiment, the first track may be initialized to a first duration that is below the initial anticipated threshold, e.g., preferably just slightly below the initial anticipated threshold, and the second track may be initialized to a second duration that is (e.g., slightly) above the initial anticipated threshold. Thus, the initial durations of the two tracks may straddle the initial anticipated threshold.

The method elements 302-308 of FIG. 3 may be performed, as described above, where the sequence of graphical element values are presented in accordance with the duration (or more generally, the stimulus intensity) of a specified one of either the first track or the second track. In other words, one of the tracks may be selected or otherwise determined, and the stimuli (values) may be presented with a duration of or specified by the selected track. Thus, in preferred embodiments, the initial anticipated threshold, the first duration, the second duration, and the (to be determined) threshold each is or includes a respective stimulus duration or presentation time (possibly including the ISI). As also described above, the participant may be required to respond to the sequence of values (306), and a determination may be made as to whether the participant responded correctly (308).

The duration (or more generally, the stimulus intensity) of the specified track may then be adjusted or modified, based on the participants response (see, e.g., 310). For example, the duration of the track may be modified in accordance with a maximum likelihood procedure, such as QUEST or ZEST, as noted above. In one embodiment, for each track, modifying the duration of the specified track based on the participants response may include increasing the duration if the participant responds incorrectly, and decreasing the duration if the participant responds correctly. Thus, for each assessment trial (in a given track), the duration for the sequence presentation for that trial may be determined by the performance of the previous trial for that track. In other words, the participants response to the stimulus determines that track's next stimulus duration via the maximum likelihood method.

Similar to 312 of FIG. 3, the visually presenting, requiring, determining, and modifying or adjusting (of the duration, or more generally, the stimulus intensity), may be repeated one or more times in an iterative manner, but in this case, the repeating is performed to determine respective final durations for the first track and the second track. For example, in one embodiment, trials in the first track and the second track may be performed in an alternating manner, or, alternatively, trials may be performed in the first track and the second track randomly with equal probability. Thus, over numerous trials, the number of trials performed in each track should be equal, or at least substantially equal. In preferred embodiments, the presenting, requiring, determining, and modifying, may be repeated until the durations of the first track and the second track have converged to values within a specified confidence interval, and where the values are within a specified distance from each other, or, until a specified number of trials have been conducted for each track. In other words, the repetition may continue until either some maximum number of trials has been performed, or until convergence conditions for the tracks have been met, both singly, and together. For example, each track may be required converge to a respective duration value, and the convergent values for the two tracks may be required to be within some distance or interval of each other.

A threshold for the participant may then be determined based on the respective final durations for the first track and the second track, where the threshold is or specifies the stimulus duration or presentation time associated with the specified performance level of the participant. For example, as mentioned above, the determined threshold may specify the duration (i.e., the presentation time) at which the participant fails to respond correctly some specified percentage of the trials, e.g., 50%, 69%, etc., although it should be noted that any other percentage may be used as desired. In one embodiment, the threshold for the participant may be determined by averaging the respective final durations for the first track and the second track. More generally, the threshold for the participant may be determined by averaging the respective final stimulus intensity values for the first track and the second track.

Thus, in one embodiment, when making an assessment, the mean of two randomly interleaved Zests may be used with estimates made at a threshold level of 50% to make the estimate (which is standard for this type of task). When training, a single staircase ZEST procedure may be used with a threshold level of 85%.

Figure 14:
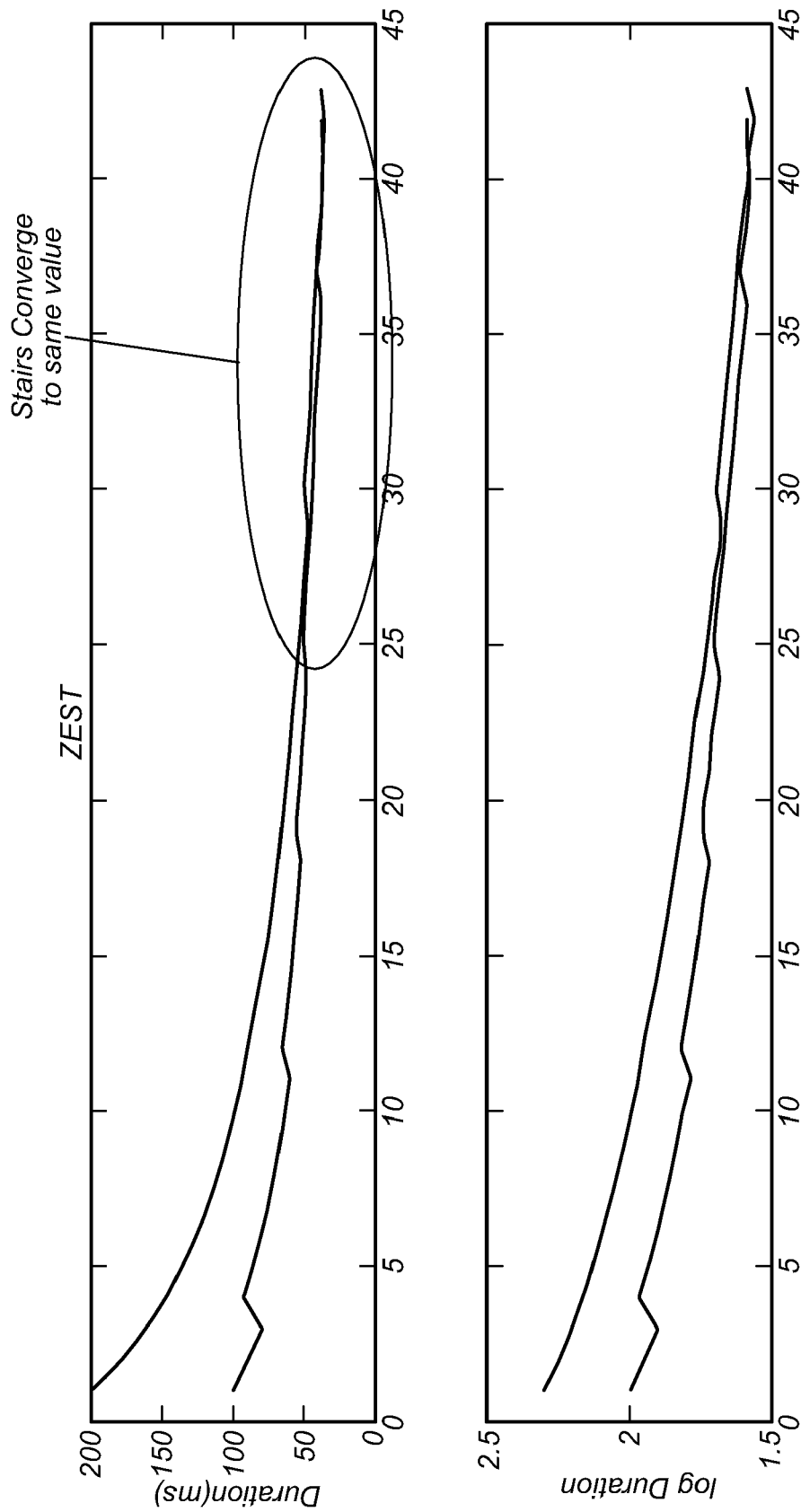
FIG. 14 illustrates convergence to a threshold value over a series of trials in an exemplary two-stair ZEST threshold procedure.

FIG. 14 illustrates an exemplary case where two tracks or "stairs" used in a ZEST threshold procedure are shown converging to a threshold value (in this case, duration) over a series of trials. Note that in the top graph, duration vs. trials is plotted in a linear manner, whereas the bottom graph provides the same information but is logarithmic on the duration (vertical) axis. As may be seen, after about 25 trials, the two tracks or stairs converge to a value at or near 50 ms, thus, the two tracks, initialized respectively to values above and below an initial estimate of the threshold, converge to an approximation of the participant's actual stimulus threshold for the exercise.

In some embodiments, a weighting factor may be specified for the initial threshold of each configuration. This is the log factor by which the final threshold of the previous configuration is adjusted for the initial threshold of the current configuration. For example, the following scale factors have been used for each of the parameters:

presentation area=[1 1 1 1]';
number of elements to match=[1 1.25 2]';
stimulus set=[1 1.25 1.5]';
gap=[1 1.25 1.5]'; and
emphasis level=[1 1.25 1.5]'.

In addition a training effect of 33% over the course of training (log function) may be assumed.

Configurations

As noted above, the exercise may include progression through a plurality of configurations that each specifies various attributes of trials performed under that configuration. While these configurations and their order in the exercise may be specified as desired, the following tables present an illustrative exemplary version of a configuration scheme, according to one embodiment. More specifically, Table 5 indicates keys or indices used to denote or retrieve configurations, and Table 6 presents an exemplary list of configurations and their attributes.

TABLE 5

Configuration Keys

| Index | presentation area in pixels (stimulus locations) | number to match | stimulus set | gap | emphasis level |
|---|---|---|---|---|---|
| 1 | 300 × 300 (16) | 2 of 3 | Set 1 | ½ presentation time | 1 |
| 2 | 400 × 400 (32) | 3 of 5 | Set 2 | ¼ presentation time | 2 |
| 3 | 500 × 500 (48) | 3 of 6 | Set 3 | None | 3 |
| 4 | 600 × 600 (68) | | | | |

TABLE 6

Configurations

| Configuration | Eccentricity (Present Area) | Number to Match | Stimulus Set | Gap | Emphasis Level | Zest Weighting Factor | Difficulty Scale |
|---|---|---|---|---|---|---|---|
| 1 | 1 | 1 | 1 | 1 | 1 | Assessment threshold | 1.148 |
| 2 | 2 | 1 | 1 | 1 | 1 | −0.009 | 1.095 |
| 3 | 3 | 1 | 1 | 1 | 1 | −0.009 | 1.046 |
| 4 | 4 | 1 | 1 | 1 | 1 | −0.008 | 1.000 |
| 5 | 1 | 2 | 1 | 1 | 1 | 0.089 | 1.536 |
| 6 | 2 | 2 | 1 | 1 | 1 | −0.008 | 1.486 |
| 7 | 3 | 2 | 1 | 1 | 1 | −0.007 | 1.438 |
| 8 | 4 | 2 | 1 | 1 | 1 | −0.007 | 1.394 |
| 9 | 1 | 1 | 2 | 1 | 1 | −0.007 | 1.352 |
| 10 | 2 | 1 | 2 | 1 | 1 | −0.006 | 1.313 |
| 11 | 3 | 1 | 2 | 1 | 1 | −0.006 | 1.276 |
| 12 | 4 | 1 | 2 | 1 | 1 | −0.006 | 1.242 |
| 13 | 1 | 2 | 2 | 1 | 1 | 0.092 | 1.853 |
| 14 | 2 | 2 | 2 | 1 | 1 | −0.005 | 1.815 |
| 15 | 3 | 2 | 2 | 1 | 1 | −0.005 | 1.780 |
| 16 | 4 | 2 | 2 | 1 | 1 | −0.005 | 1.747 |
| 17 | 1 | 1 | 3 | 1 | 1 | −0.022 | 1.592 |
| 18 | 2 | 1 | 3 | 1 | 1 | −0.004 | 1.565 |
| 19 | 3 | 1 | 3 | 1 | 1 | −0.004 | 1.538 |
| 20 | 4 | 1 | 3 | 1 | 1 | −0.004 | 1.514 |

TABLE 6-continued

| Configuration | Eccentricity (Present Area) | Number to Match | Stimulus Set | Gap | Emphasis Level | Zest Weighting Factor | Difficulty Scale |
|---|---|---|---|---|---|---|---|
| 21 | 1 | 2 | 3 | 1 | 1 | 0.093 | 2.204 |
| 22 | 2 | 2 | 3 | 1 | 1 | −0.003 | 2.177 |
| 23 | 3 | 2 | 3 | 1 | 1 | −0.003 | 2.152 |
| 24 | 4 | 2 | 3 | 1 | 1 | −0.003 | 2.128 |
| 25 | 1 | 1 | 1 | 2 | 2 | −0.082 | 1.528 |
| 26 | 2 | 1 | 1 | 2 | 2 | −0.003 | 1.511 |
| 27 | 3 | 1 | 1 | 2 | 2 | −0.002 | 1.495 |
| 28 | 4 | 1 | 1 | 2 | 2 | −0.002 | 1.479 |
| 29 | 1 | 3 | 1 | 2 | 2 | 0.299 | 4.292 |
| 30 | 2 | 3 | 1 | 2 | 2 | −0.002 | 4.265 |
| 31 | 3 | 3 | 1 | 2 | 2 | −0.002 | 4.240 |
| 32 | 4 | 3 | 1 | 2 | 2 | −0.002 | 4.217 |
| 33 | 1 | 1 | 2 | 2 | 2 | −0.206 | 2.111 |
| 34 | 2 | 1 | 2 | 2 | 2 | −0.002 | 2.098 |
| 35 | 3 | 1 | 2 | 2 | 2 | −0.002 | 2.086 |
| 36 | 4 | 1 | 2 | 2 | 2 | −0.001 | 2.075 |
| 37 | 1 | 3 | 2 | 2 | 2 | 0.3 | 5.490 |
| 38 | 2 | 3 | 2 | 2 | 2 | −0.001 | 5.470 |
| 39 | 3 | 3 | 2 | 2 | 2 | −0.001 | 5.452 |
| 40 | 4 | 3 | 2 | 2 | 2 | −0.001 | 5.434 |
| 41 | 1 | 1 | 3 | 2 | 2 | −0.223 | 2.706 |
| 42 | 2 | 1 | 3 | 2 | 2 | −0.001 | 2.697 |
| 43 | 3 | 1 | 3 | 2 | 2 | −0.001 | 2.688 |
| 44 | 4 | 1 | 3 | 2 | 2 | −0.001 | 2.680 |
| 45 | 1 | 3 | 3 | 2 | 2 | 0.3 | 6.707 |
| 46 | 2 | 3 | 3 | 2 | 2 | −0.001 | 6.693 |
| 47 | 3 | 3 | 3 | 2 | 2 | −0.001 | 6.679 |
| 48 | 4 | 3 | 3 | 2 | 2 | −0.001 | 6.667 |
| 49 | 1 | 2 | 1 | 3 | 3 | −0.222 | 3.448 |
| 50 | 2 | 2 | 1 | 3 | 3 | −0.001 | 3.442 |
| 51 | 3 | 2 | 1 | 3 | 3 | −0.001 | 3.436 |
| 52 | 4 | 2 | 1 | 3 | 3 | −0.001 | 3.430 |
| 53 | 1 | 3 | 1 | 3 | 3 | 0.204 | 6.296 |
| 54 | 2 | 3 | 1 | 3 | 3 | 0 | 6.288 |
| 55 | 3 | 3 | 1 | 3 | 3 | 0 | 6.280 |
| 56 | 4 | 3 | 1 | 3 | 3 | 0 | 6.273 |
| 57 | 1 | 2 | 2 | 3 | 3 | −0.108 | 4.598 |
| 58 | 2 | 2 | 2 | 3 | 3 | 0 | 4.593 |
| 59 | 3 | 2 | 2 | 3 | 3 | 0 | 4.589 |
| 60 | 4 | 2 | 2 | 3 | 3 | 0 | 4.584 |
| 61 | 1 | 3 | 2 | 3 | 3 | 0.204 | 8.145 |
| 62 | 2 | 3 | 2 | 3 | 3 | 0 | 8.139 |
| 63 | 3 | 3 | 2 | 3 | 3 | 0 | 8.134 |
| 64 | 4 | 3 | 2 | 3 | 3 | 0 | 8.128 |
| 65 | 1 | 2 | 3 | 3 | 3 | −0.125 | 5.752 |
| 66 | 2 | 2 | 3 | 3 | 3 | 0 | 5.749 |
| 67 | 3 | 2 | 3 | 3 | 3 | 0 | 5.745 |
| 68 | 4 | 2 | 3 | 3 | 3 | 0 | 5.742 |
| 69 | 1 | 3 | 3 | 3 | 3 | 0.204 | 10.000 |
| 70 | 2 | 3 | 3 | 3 | 3 | 0 | 9.996 |
| 71 | 3 | 3 | 3 | 3 | 3 | 0 | 9.992 |
| 72 | 4 | 3 | 3 | 3 | 3 | 0 | 9.988 |

Note that in that in some embodiments, the method may include "under the hood" assessments. In other words, assessments may be made at these points in the exercise, possibly without the knowledge of the participant. Note further that in the above exemplary configurations, there are 30 trials per configuration, although this number may be any other value desired.

In some embodiments, the method may also include performing a plurality of practice trials, i.e., prior to performing the method elements described above. For example, in some embodiments, one or more practice sessions may be performed prior to the beginning of training to familiarize the participant with the nature and mechanisms of the exercise. For example, in one embodiment, before training begins, the participant may perform at least one practice session including a specified number of trials (e.g., 5) for each of one or more practice configurations. In some embodiments, the participant may be able to invoke such practice sessions at will during the exercise, e.g., to re-familiarize the participant with the task at hand.

In some embodiments, additional trials, referred to as "eureka" trials, may be performed periodically, e.g., every 20 trials or so, including non-ZEST trials that are easier than the current threshold estimate—e.g. using durations that are twice the threshold. These easier trials may serve to encourage the participant to continue the exercise, and improve or maintain the participant's morale.

Thus, embodiments of the guided eye movement exercise described herein may operate to improve a participants cognition, including, for example, frequency of saccade, minimal fixation duration (or other stimulus intensity) required to extract information from the visual scene, overall speed and accuracy of visual processing, and attention, among others. It should be noted that the particular exercise disclosed herein is meant to be exemplary, and that other repetition-based cognitive training exercises using visual stimuli with multiple stimulus sets may be used as desired, possibly in combination. In other words, the guided eye movement exercise described herein is but one example of a cognitive training exercise using a computing system to present visual stimuli to a participant, record the participant's responses, and modify some aspect of the visual stimuli based on these responses, where these method elements are repeated in an iterative manner using multiple sets of stimuli to improve the cognition of the participant, e.g., to process visual information. Note particularly that such cognitive training using a variety of such visual stimulus-based exercises, possibly in a coordinated manner, is contemplated.

Those skilled in the art should appreciate that they can readily use the disclosed conception and specific embodiments as a basis for designing or modifying other structures for carrying out the same purposes of the present invention without departing from the spirit and scope of the invention as defined by the appended claims. For example, various embodiments of the methods disclosed herein may be implemented by program instructions stored on a memory medium, or a plurality of memory media.

We claim:

1. A method for enhancing cognition in a participant, utilizing a computing device to present visual stimuli for training, and to record responses from the participant, the method comprising:
   providing multiple graphical elements, and wherein the multiple graphical elements are available for visual presentation to the participant;
   visually presenting a temporal sequence of a plurality of the graphical elements, including displaying each graphical element in the sequence at a respective location in a visual field for a specified duration, then ceasing to display the graphical element, wherein the plurality of the graphical elements includes at least two matching graphical elements;
   requiring the participant to respond to the presented sequence, including indicating locations of matching graphical elements;
   determining whether the participant responded correctly;
   modifying the duration based on said determining; and
   repeating said visually presenting, said requiring, said determining, and said modifying one or more times in an iterative manner to improve the participant's cognition.

2. The method of claim 1, wherein the plurality of graphical elements comprises the at least two matching graphical elements and one or more distractors, wherein the distractors differ from the matching graphical elements in one or more of:
   colors;
   patterns; and/or
   shapes.

3. The method of claim 2, wherein said visually presenting, said requiring, and said determining compose performing a trial, and wherein said repeating comprises performing a plurality of trials under each of a plurality of configurations, wherein each configuration specifies one or more attributes of the plurality of graphical elements or their presentation.

4. The method of claim 3, wherein the visual field comprises a plurality of potential stimulus locations, wherein said visually presenting a temporal sequence of a plurality of the graphical elements comprises presenting the graphical elements of the sequence at respective ones of the potential stimulus locations.

5. The method of claim 4, wherein the respective ones of the potential stimulus locations are selected randomly or pseudo-randomly.

6. The method of claim 4, wherein each of the plurality configurations specifies one or more of:
   stimulus presentation area, wherein the stimulus presentation area comprises at least a subset of the visual field;
   minimum number of potential stimulus locations;
   number of graphical elements in the sequence;
   number of matching graphical elements in the sequence;
   stimulus set, comprising a set of graphical elements from which the plurality of graphical elements of the sequence are selected, wherein the graphical elements of the stimulus set have a specified discriminibility;
   gap, comprising a specified amount of time between ceasing display of a graphical element and displaying a next graphical element in the sequence; and
   emphasis level, specifying a degree of distinguishability of the presented graphical elements with respect to a background of the visual field.

7. The method of claim 6, wherein said performing a plurality of trials under each of a plurality of configurations comprises one or more of:
   co-varying the stimulus presentation area with the minimum number of potential stimulus locations; or
   co-varying the gap with the emphasis level.

8. The method of claim 6, wherein said performing a plurality of trials under each of a plurality of configurations comprises:
   performing a plurality of trials under each of a plurality of configurations of varying difficulty.

9. The method of claim 8, wherein said performing a plurality of trials under each of a plurality of configurations of varying difficulty comprises performing a plurality of trials under each of a plurality of increasingly difficult configurations for each of a succession of levels, wherein each level specifies:
   a respective visual field layout and background;
   a respective emphasis level;
   a respective stimulus type corresponding to the emphasis level.

10. The method of claim 4, further comprising:
    indicating whether the participant responded correctly, wherein said indicating is performed audibly and/or graphically.

11. The method of claim 10, wherein said indicating whether the participant responded correctly comprises:
    for each location indication, indicating whether the indicated location is correct.

12. The method of claim 10, wherein said indicating whether the participant responded correctly comprises one or more of:
    presenting a reward in response to the participant responding correctly; or
    presenting a punishment in response to the participant not responding correctly.

13. The method of claim 12, wherein said determining if the participant responded correctly comprises determining that the participant correctly indicated the locations of all matching graphical elements in the sequence, wherein the indicated locations comprise a first indicated location and a last indicated location.

14. The method of claim 13, wherein said presenting a reward in response to the participant responding correctly comprises:
presenting a graphical reward at the last indicated location.

15. The method of claim 13, wherein each potential stimulus location is associated with a respective object, wherein the object is progressable through a plurality of developmental stages, including an initial stage and a final stage, wherein each object comprises an icon indicating a current stage of the respective object and displayed at the potential stimulus location, and wherein said presenting a reward in response to the participant responding correctly comprises:
incrementing the stage for an object associated with the final indicated location, wherein said incrementing comprises displaying the icon indicating the stage of the object.

16. The method of claim 15, wherein when an object associated with a potential stimulus location is at the final stage, graphical elements of a presented sequence are prohibited from being displayed at that potential stimulus location.

17. The method of claim 15, wherein the potential stimulus locations comprise a plurality of groups, each comprising a respective disjoint subset of the potential stimulus locations with their respective objects, the method further comprising:
in response to determining that all objects in a group are at the final stage:
presenting a group reward; and
re-setting all objects in the group to the initial stage, including updating the icons to indicate the initial stage.

18. The method of claim 17, wherein said updating the icons to indicate the initial stage comprises displaying an initial stage icon that indicates said presenting a group reward has occurred.

19. The method of claim 17, the method further comprising:
in response to determining that an object is at the final stage:
incrementing the stage of each other object in the group; and
updating the icons for each incremented object to indicate their respective stages;
performing said incrementing the stage of each other object in the group and said updating in response to each object in the group reaching the final stage due to said incrementing.

20. The method of claim 17, the method further comprising:
in response to determining that no stages for any objects in a group have been incremented for a first specified number of trials:
graphically indicating a first level of stasis for the group.

21. The method of claim 17, the method further comprising:
in response to determining that no stages for any objects in a group have been incremented for a further second specified number of trials:
graphically indicating a second level of stasis for the group; and
decrementing the respective stages of objects in the group that are not at the initial stage.

22. The method of claim 21, the method further comprising:
in response to determining that no stages for any objects in a group have been incremented for a further third specified number of trials:
graphically indicating a next level of stasis for the group; and
decrementing the respective stages of objects in the group that are not at the initial stage.

23. The method of claim 22, the method further comprising:
for each further third specified number of trials in which no stages for any objects in a group have been incremented graphically indicating a next level of stasis for the group; and
decrementing the respective stages of objects in the group that are not at the initial stage.

24. The method of claim 23, further comprising:
in response to determining that all objects in a group are at the initial stage:
removing the graphical indication of stasis for the group.

25. The method of claim 23, further comprising:
for a group with a stasis level, in response to incrementing the stage of at least one object in the group, resetting the level of stasis of the group to none.

26. The method of claim 23, further comprising:
in response to a configuration wherein the stimulus presentation area is decreased,
for any group with a stasis level in deactivated areas, removing the graphical indication of stasis for the group.

27. The method of claim 17, wherein each group is progressable through multiple group stages, including an initial group stage and a final group stage, wherein said presenting a group reward comprises:
incrementing the group stage of the group, comprising:
for a first group reward for the group, setting the group stage of the group to the initial group stage; and
displaying an icon proximate to the group indicating the group stage of the group.

28. The method of claim 27, the method further comprising:
in response to said incrementing the group stage of the group:
incrementing the stage of objects in all other groups in the stimulus presentation area.

29. The method of claim 27, wherein the icon indicating the group stage of the group comprises a portion of a central object icon, wherein the central reward icon corresponds to a central object, the method further comprising:
in response to a group achieving the final group stage:
presenting a central reward, comprising:
adding the icon indicating the group stage of the group to the central object icon and displaying the central object icon.

30. The method of claim 29, wherein the central object is progressable through multiple central object stages, including an initial central object stage and a final central object stage, wherein said presenting a central reward comprises:
incrementing the central object stage, including:
displaying the central object icon to indicate the central object stage of the central object.

31. The method of claim 30,
wherein said incrementing the central object stage comprises:
for a first central reward for a level, setting the central object stage to the initial central object stage; and
wherein said displaying the central object icon indicating the central object stage of the central object comprises:
for the final central object stage, displaying a complete central object icon for the level.

32. The method of claim 17, wherein at least one of the group rewards comprises a power-up, comprising one or more:
- random rewards for a plurality of objects;
- presentation of one or more animations;
- removal of a distractor from at least one sequence;
- repetition of said visually presenting a temporal sequence for at least one sequence; or
- suspension of said ceasing to display the graphical element for at least one sequence.

33. The method of claim 3, wherein said modifying comprises:
- adjusting the duration for said visually presenting based on whether the participant responded correctly;
- wherein said adjusting is performed using a maximum likelihood procedure.

34. The method as recited in claim 33, wherein the maximum likelihood procedure comprises one or more of:
- a QUEST (quick estimation by sequential testing) threshold procedure; or
- a ZEST (zippy estimation by sequential testing) threshold procedure.

35. The method of claim 33, wherein said adjusting the duration comprises:
- adjusting the duration to approach and substantially maintain a specified success rate for the participant.

36. The method of claim 35, wherein said adjusting the duration to approach and substantially maintain a specified success rate for the participant is performed for each of the plurality of configurations.

37. The method of claim 35, wherein said adjusting the duration to approach and substantially maintain a specified success rate for the participant uses a single stair maximum likelihood procedure.

38. The method of claim 33, wherein said repeating comprises:
- assessing the participant's performance a plurality of times during said repeating.

39. The method of claim 38, wherein said assessing the participant's performance a plurality of times is performed according to the maximum likelihood procedure.

40. The method of claim 39, wherein said assessing the participant's performance a plurality of times is performed using a 2-stair maximum likelihood procedure.

41. The method of claim 33, wherein said adjusting the duration comprises:
- if the participant responds correctly, decreasing the duration; and
- if the participant responds incorrectly, increasing the duration.

42. The method of claim 3, further comprising:
recording each response of the participant; and/or
recording whether the participant responded correctly.

43. The method of claim 1, further comprising:
performing trials in one or more practice sessions under each of one or more configurations.

44. The method of claim 1, wherein said repeating is performed a specified number of times each day, for a specified number of days.

45. A computer-readable memory medium that stores program instructions for enhancing cognition in a participant, utilizing a computing device to present visual stimuli for training, and to record responses from the participant, wherein the program instructions are executable by a processor to perform:
- providing multiple graphical elements, and wherein the multiple graphical elements are available for visual presentation to the participant;
- visually presenting a temporal sequence of a plurality of the graphical elements, including displaying each graphical element in the sequence at a respective location in a visual field for a specified duration, then ceasing to display the graphical element, wherein the plurality of the graphical elements includes at least two matching graphical elements;
- requiring the participant to respond to the presented sequence, including indicating locations of matching graphical elements;
- determining whether the participant responded correctly;
- modifying the duration based on said determining; and
- repeating said visually presenting, said requiring, said determining, and said modifying one or more times in an iterative manner to improve the participant's cognition.

* * * * *